United States Patent

Busick et al.

[15] 3,655,921

[45] Apr. 11, 1972

[54] ELECTRONIC ROUTE TRANSLATOR

[72] Inventors: Richard Cobbold Busick; Eugene Daniel Masucci, both of Columbus, Ohio

[73] Assignee: Bell Telephone Laboratories, Incorporated, Murray Hill, Berkeley Heights, N.J.

[22] Filed: Mar. 30, 1970

[21] Appl. No.: 23,942

[52] U.S. Cl. .......... 179/18 ET
[51] Int. Cl. .......... H04q 3/47
[58] Field of Search .......... 179/18 ET, 18 ES

[56] References Cited

UNITED STATES PATENTS 3,527,896 9/1970 Hills et al. .......... 179/18 ET

*Primary Examiner*—Kathleen H. Claffy
*Assistant Examiner*—Thomas W. Brown
*Attorney*—R. J. Guenther and James Warren Falk

[57] ABSTRACT

An electronic route translation system arranged to translate a first combination of 3, 4, or 6 numerical digits to a second predetermined combination of 3 numerical digits. The translator selectively reads segments of word information directly from memory into one output register without using additional adding, subtracting, shifting or masking functions. The read feature permits the same address in memory to be interrogated several times in a single translation with different segments of the same word being used each time. Internal manipulations are accomplished by data substitution in the address field. The input digits are employed without conversion to form the first translation table address and subsequent addresses are formed by a combination of the input digits and control data obtained from interrogation of the memory. A check is applied to each registered digit after every register transfer, thereby providing an extremely well-defined error stop function.

22 Claims, 23 Drawing Figures

INVENTORS R. C. BUSICK
E. D. MASUCCI
BY Brendan A. Ward
ATTORNEY

Patented April 11, 1972

3,655,921

21 Sheets-Sheet 5

Patented April 11, 1972 3,655,921

21 Sheets-Sheet 6

Patented April 11, 1972 3,655,921

21 Sheets-Sheet 12

Patented April 11, 1972

3,655,921

21 Sheets-Sheet 14

ELECTRONIC ROUTE TRANSLATOR

BACKGROUND OF THE INVENTION

1. Field of the Invention

This invention relates to translation arrangements in automatic switching systems. More particularly, this invention relates to the translation of a station address to a route indication code in order that an originating station or incoming communication path may be directed to an outgoing communication path associated with the location defined by the station address.

2. Description of the Prior Art

The automatic switching of communication paths on a national basis requires that directing codes or digits be prefixed to local station designations in order that calls may be directed to their proper destinations. The directing codes or digits required for such switching purposes have been arrived at by dividing the nation into areas. The size of each area generally depends upon the number of telephone stations therein and each area is assigned a three-digit numbering plan area code hereinafter referred to as an NPA code.

Prior to the institution of the NPA code, the volume of telephone traffic in certain heavily populated areas of the country, for example, the area surrounding large cities, required the establishment of special trunking facilities within the area in spite of the fact that relatively short distances were involved. When the NPA codes were established, it was found necessary to divide such heavily populated areas, assigning one NPA code to one portion and other NPA codes to the remaining portions.

In a large nationwide comprehensive switching plan, low traffic volume may dictate that only a single communication path be provided between a local area and another NPA, herein called a foreign area. On the other hand, a large volume of traffic emanating from a local area and routed to several points within a particular foreign area, possibly located in a heavily populated section, may required that several separate and distinct communication paths be established to the same foreign area.

The above-described direct distance dialing network, hereinafter referred to as the DDD network, requires that automatic switching offices handling traffic between local and foreign areas establish the proper communication path in response to the dialed NPA code. In addition, those offices handling traffic to various points within the same foreign area must utilize the called three-digit central office code in addition to the NPA code in order to select the required communication path to a particular called foreign area point.

Within the DDD network, there is a service offering providing for the interconnection of a multiplicity of commercial subscribers' locations by means of a segregated network. Several commercial subscribers may share a switching office but the switched interconnection of each subscriber's network is accomplished over dedicated trunk facilities. Each dedicated network has its own unique routing plan wherein every station is identified by an arbitrary seven-digit address including a three-digit office code. In addition, a commercial subscriber may have the option to originate a call from a dedicated network station to certain restricted points in a NPA of the DDD network.

An automatic telephone switching office handling a number of different commercial subscribers, each with a different numbering plan and network configuration and in addition serving the DDD network, must be capable of translating a variety of 3-, 4-, and 6-digit combinations into necessary switching instructions.

Prior art translation apparatus as typified by the electronic telephone switching system disclosed in U.S. Pat. No. 2,955,165, granted to W. A. Budlong et al. on Oct. 4, 1960, employs a series of single coordinate memory tables to perform NPA and central office code translations. Although the Budlong disclosure is a substantial contribution to technology, certain deficiencies are manifest therein as will be apparent in the following.

Basically, the prior art procedure is to access a memory table along a single coordinate and to read all the information stored therein. The stored information contains supplemental address information which, in turn, points to single coordinate locations in additional translation tables. The translation memory tables are variable in length, but because of circuit considerations are constructed to a specific word width. However, multidigit translations often require that information of various lengths be stored in the memory table word locations. Since the word width is required to be uniform, in such memory arrangements, the need for varying amounts of information requires that more memory apparatus be provided than in fact is used. When it is recognized that memory capacity is inherently expensive, it is obvious that such limitations impose an economic burden and result in less efficient arrangements than that which is desired.

Accordingly, a need exists in the art for a translating arrangement capable of performing 3-, 4-, and 6-digit translations for a multiplicity of commercial subscribers in addition to those required for the DDD network. A need also exists for an arrangement which will obviate the need for more memory apparatus than in fact is used and which will also perform the required translation functions with a high degree of efficiency. A need also exists for an arrangement which will perform translations in a manner readily adaptable to any switching system office irrespective of the type of office involved.

SUMMARY OF THE INVENTION

In the exemplary embodiment, a magnetic memory device is utilized as the translating apparatus. The memory is organized into a plurality of matrices each comprising a plurality of horizontally orientated words and a plurality of vertically orientated data digits. Each data digit is composed of a group of five binary bits arranged to store a decimal digit in the well-known 2-out-of-5 code format.

Information relating to different types of translations is organized into translation tables and stored within the matrix word and data digit locations. A translation is performed by registering input data in an address field and interrogating a horizontally oriented word defined by the address field and selectively reading out translation control information contained in a predetermined number of vertically orientated data digits.

Apparatus is provided for registering the translation control information and for executing additional memory interrogations and read functions in response to a combination of input data and translation control information. Additional apparatus is also provided to register input data and to transmit output information to an external source. Apparatus is also provided to perform an internal check on each five bits of data after every register transfer.

Thus the limitation posed by the prior art of reading an entire word from memory and subsequently shifting and masking the contents thereof to obtain desired translation instructions has been solved by our invention. It is now possible to store several translation table segments within a memory word and selectively read a word segment directly into an output register having less storage capacity than the total word capacity.

One feature of our invention is the provision of a plurality of selectively controlled means to enable a predetermined number of read apparatus less than the aggregate required for a word total bit capacity to read stored translation control information from a word sector into an output register.

Another feature of our invention is the provision of a plurality of output registers to record the stored translation control information wherein the total number of output registers is less in number than the total aggregate of read apparatus.

In accordance with a further feature of our invention, the foregoing features are accomplished with the provision of apparatus for performing an internal error check on the existence of a valid N-out-of-M code format of register contents and stored memory translation control information.

In accordance with still another feature of our invention, the foregoing features are accomplished in a translation device arranged to be used with existing prior art switching systems without material alteration of the other switching circuits of said systems.

DESCRIPTION OF THE DRAWING

The foregoing objects, features and advantages, as well as others of the invention, will be more apparent from a description of the drawing, in which.

The logic of the route translator is performed by combinations of logic gates, inverters, monopulsers, and flip-flops, the operation and schematic representation of which are well known in the art and need not be described here. Where logic symbols are involved, a dot on the input is an indication that a battery voltage is required to activate the circuit. The absence of a dot is used to indicate that ground is required to activate the circuit. The resulting polarity of the circuit output may be determined in the same manner. For example, battery on the set lead of a flip-flop results in ground on the 1 lead output.

It will be noted that FIGS. 3 through 7 employ a type of notation referred to as "Detached Contact" in which an X, shown intersecting a conductor, represents a normally open "-make" contact of a relay, and a "bar," shown intersecting a conductor at right angles, represents a normally closed "-break" contact of a relay; "normally" referring to the unoperated condition of the relay. The principles of this type of notation are described in an article entitled "An Improved Detached-Contact-Type of Schematic Circuit Drawing" by F. T. Meyer, in the September, 1955, publication of *American Institute of Electrical Engineers Transactions, Communications and Electronics*, Volume 74, pages 505–513.

1. General Description

Figure 1:
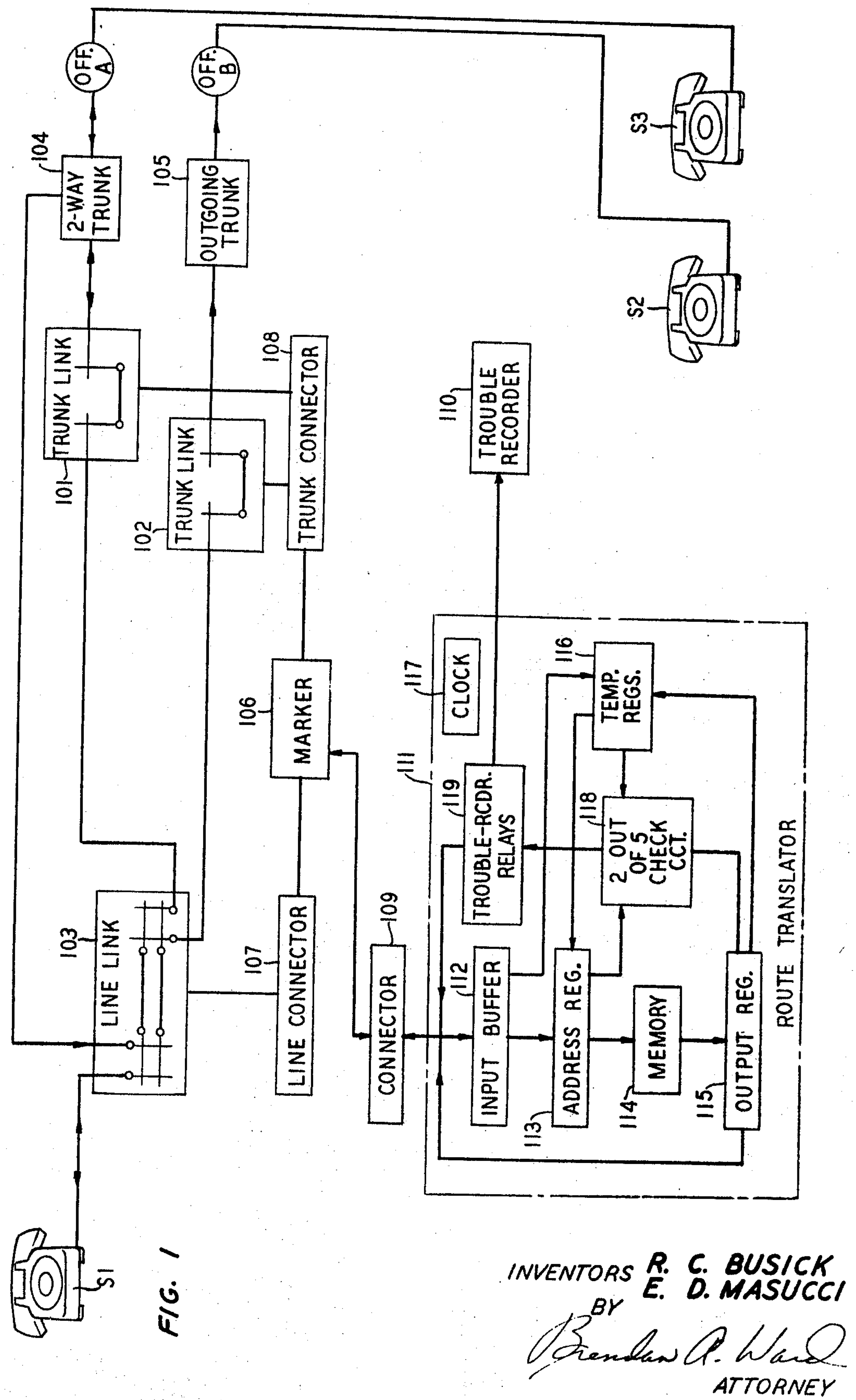
FIG. 1 is a block diagram showing the interrelationship of the various components of an illustrative embodiment of our invention.

Referring now to FIG. 1, it is intended that the apparatus shown thereon be associated with a conventional telephone central office of the type disclosed in U.S. Pat. No. 2,587,817 of Mar. 4, 1952, issued to A. J. Busch, et al. It is further intended that the central office comprises a switching network made up of trunk links 101 and 102 for terminating trunks 104 and 105 and line link 103 for terminating subscriber line circuits for stations such as station S1. It is also intended that switching paths within such switching network be established under control of marker 106 operating through connectors 107 and 108.

The central office of the embodiment is modified by the replacement of the prior art translation apparatus with route translator 111. Route translator 111 comprises an input buffer 112 for registering information from marker 106 and an address register 113 for recording word locations within magnetic memory 114. In addition, there is an output register 115 for recording translation information read from memory 114 and temporary registers 116 for storing transitory control information prior to future use by the address register 113.

There is also a clock circuit 117 for controlling the various translation cycles and a 2-out-of-5 check circuit 118 for determining the validity of information recorded in the registers. For the purpose of the embodiment we shall assume a trouble recorder 110, nominally a part of the conventional telephone central office, wherein may be recorded trouble indications detected by trouble recorder relays 119.

Figure 2:
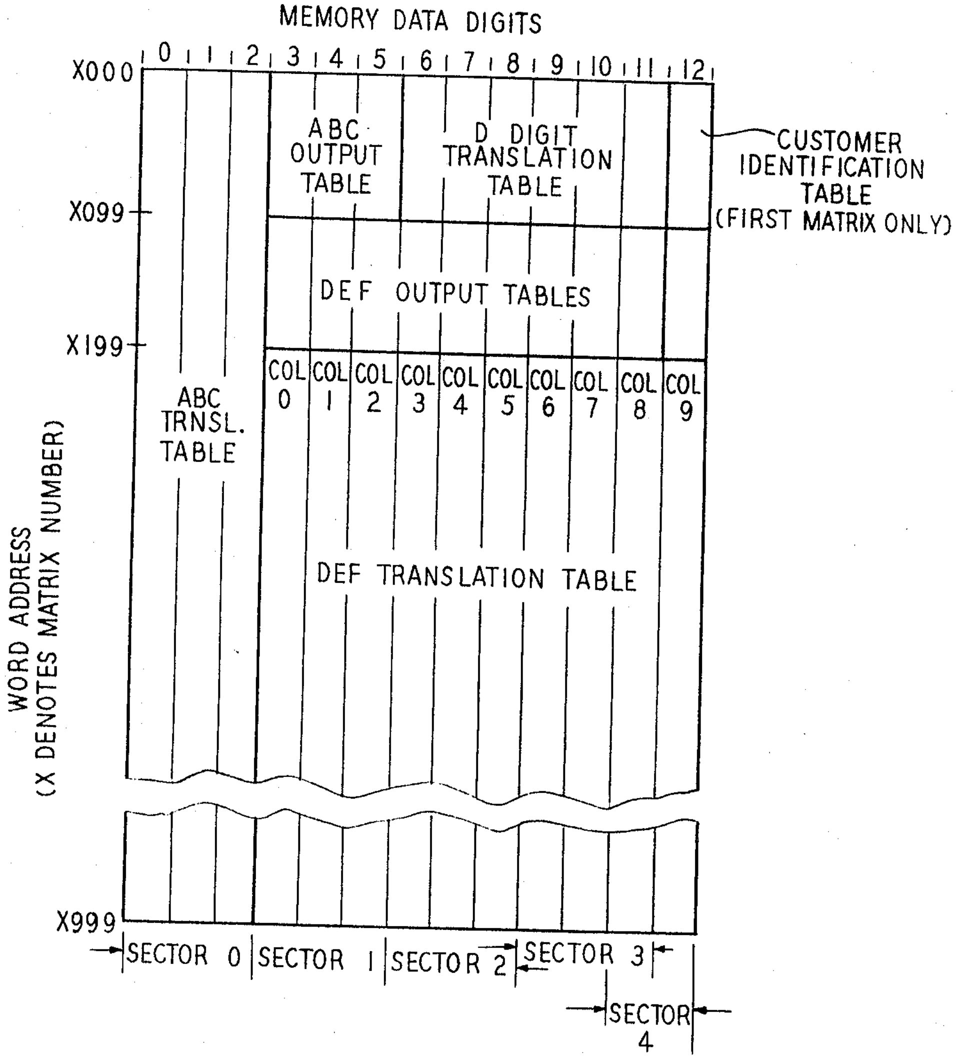
FIG. 2 is a block diagram of the functional organization of information within a memory matrix.
Figure 22:
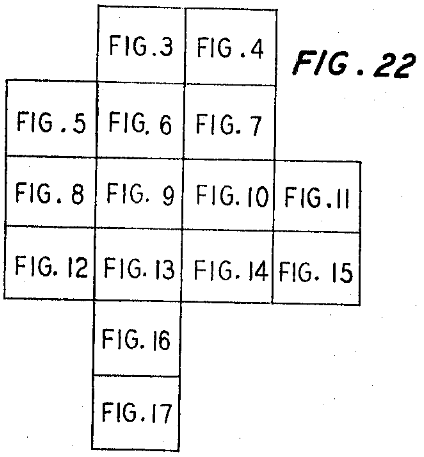
FIGS. 22 and 23 show the manner in which FIGS. 3 through 21 should be arranged.
Figure 23:
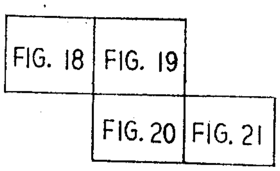

As shown in FIG. 2, memory 114 is functionally organized into a plurality of matrices wherein each matrix consists of 1,000 horizontally oriented words. We shall also assume that each basic word is comprised of 65 bits of binary information arranged in groups of five bits so as to form 13 vertically oriented 2-out-of-5 coded data digits consecutively numbered 0 through 12. In addition, each of the memory matrices is organized into five sectors numbered 0 to 4 wherein sectors 0 to 3 each encompass three data digits in sequence and sector 4 is comprised of data digits 11 and 12.

For the purpose of this embodiment we shall functionally organize each memory matrix into the following translation tables: (a) The first three data digits of every word are combined into a single ABC translator 1,000 words in length and three data digits wide. Each ABC translator word three-digit position contains a stored single digit operational code in data digit 0 and two digits of additional address information in data digit positions 1 and 2. (b) Sector 1, composed of data digits 3, 4, and 5, of the first 100 words comprises the ABC output table wherein is stored the three-digit translation route code answer. (c) Subsequent sectors 2 and 3 of the same 100 words are designated digit translators and, as will be apparent from that which is contained hereinafter, are subdivided into 20 translators with 10 outputs per translator. (d) Data digit 12 of sector 4 of the first 100 words of the first matrix comprises a customer identification table wherein calling subscriber identification information is translated into a customer service digit identifying a specific matrix for use by the calling subscriber. (e) Within each memory matrix there are ten DEF digit translation columns wherein is stored an additional digit of address information required for the six-digit translation function. The DEF translator columns are numbered 0 through 9 and constitute the DEF translation table which occupies data digits 3 through 12 of words 200 to 999. (f) Sectors 1, 2, 3 and digit 11 of sector 4 of the second 100 words comprises the DEF output table wherein is stored the six-digit translation route code answers.

We shall now assume, FIG. 1, for the purposes of the description that subscriber station S1, has originated a call in which it is requested that a communication path be established from line link 103 to trunk link 102 and over outgoing trunk circuit 105 to a station S2 at central office B. We shall further assume as an illustrative embodiment, a central office of the type disclosed in the cited Busch et al. patent wherein such a request as described above would result in the marker recording the dialed directory number and the subscriber identification information as the subscriber class of service.

It is also to be understood that an incoming call from station S3 to central office A over two-way trunk 104 may be switched by the combination of line link 103 and trunk link 102 to central office B to station S2. For such a connection, marker 106 records the subscriber identification information as the trunk class.

Upon receipt of the above information, marker 106 initiates a seizure of translating device 111, hereinafter called a route translator, via connector 109 and transfers the first six digits of the called directory number and the complete subscriber identification information to input buffer 112.

Seizure of the route translator initiates an orderly sequence to transfer the subscriber identification information from input buffer 112 into temporary registers 116 and to initialize clock 117 in preparation to start the first machine cycle of eight equal clock timing pulses. Basically, the eight clock pulses are utilized to move information data into and out of various registers, initiate the interrogation and read functions required to obtain control information from memory 114, and to gate the various register information into 2-out-of-5 check circuit 118 for a check of the proper code format.

During the first machine cycle, the subscriber identification information is gated into address register 113 and the customer identification table of the first memory matrix is interrogated at the word location specified by the address register. The customer service digit stored in data digit 12 is read from the customer identification table into output register 115 and is subsequently gated into temporary registers 116.

The second machine cycle gates the first three digits of the called directory number and the customer service digit into address register 113 and interrogates the ABC translation table at the word location registered in address register 113 and reads the first three data digits into output register 115.

The operation code stored in data digit 0 of the ABC translation tables determines the manner in which the subsequent translation manipulations are to be performed. If the operation code specifies that the route translator is to perform a 3- or 4-digit translation, the third machine cycle will read a three-digit route code answer from the respective ABC output, or D digit translation, table into output register 115. In the event the operation code specifies either a six-digit or special translation, the third machine cycle is utilized to interrogate a DEF translator and read the single digital content thereof into output register 115. During the fourth machine cycle, the route translator will gate the route code obtained from memory 114 during the third cycle for 3- and 4-digit translations; or read and gate the route code for a six-digit translation, into marker 106 via connector 109.

The marker then proceeds in the well-known manner to establish a communication path defined by the route code from subscriber station S1 appearance on line link 103 to trunk link 102 and over outgoing trunk 105 to central office B and to station S2 in the well-known manner. If the call originates from station S3 served by central office A, the marker in a likewise manner proceeds to establish a communication path defined by the route code from the two-way trunk 104 appearance on line link 103 to trunk link 102 and over trunk 105 to central office B to station S2.

2. Detailed Description

A. Route Translator Seizure

When a subscriber station S1, or subscriber station S3 (via two-way trunk 104), initiates a request for service, marker 106 receives the dialed directory digits and the respective subscriber class of service, or trunk class, information identifying the requesting circuit.

Figure 3:
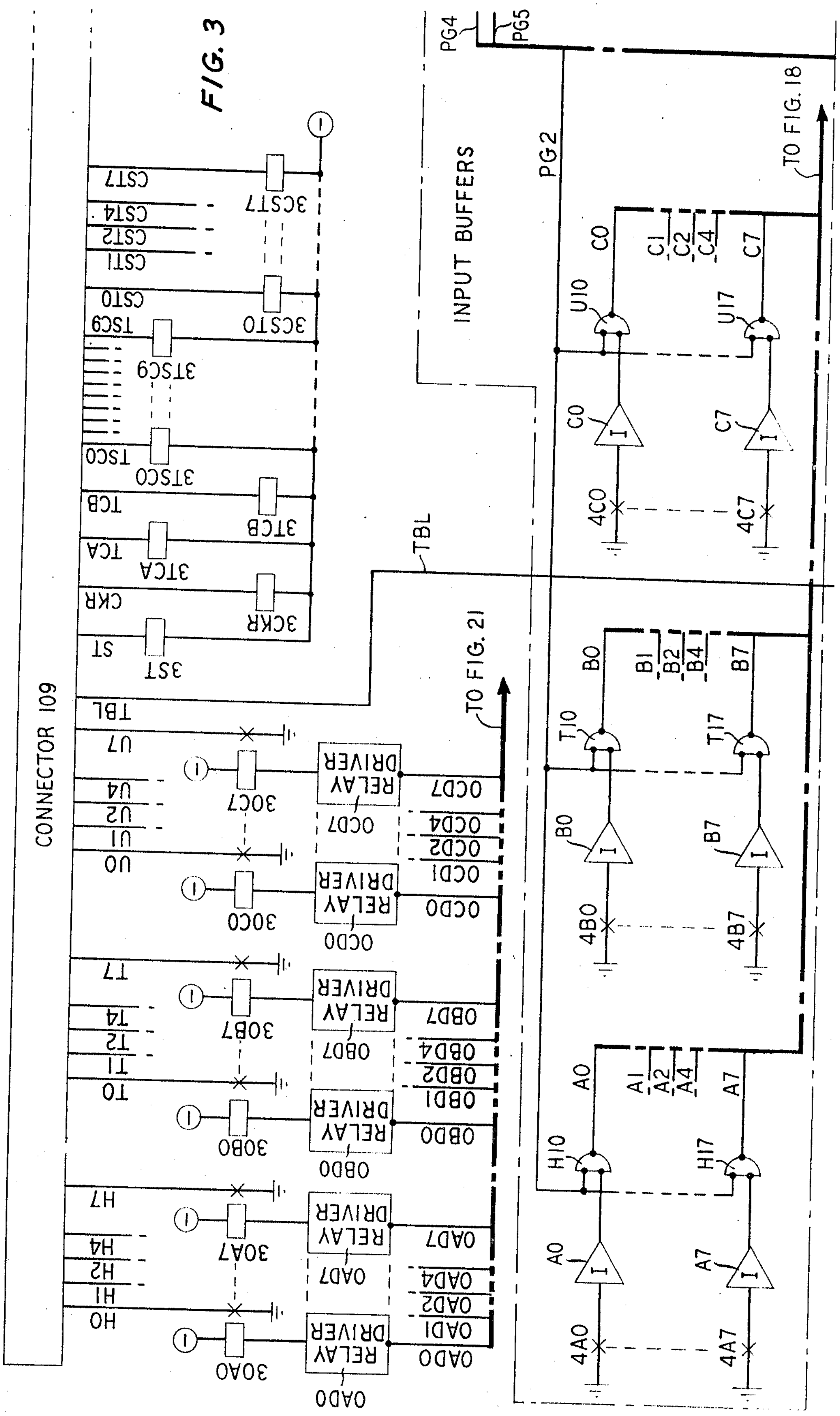
FIGS. 3 and 4 are a schematic diagram of the input and output recording apparatus and the directory number input buffers.
Figure 4:
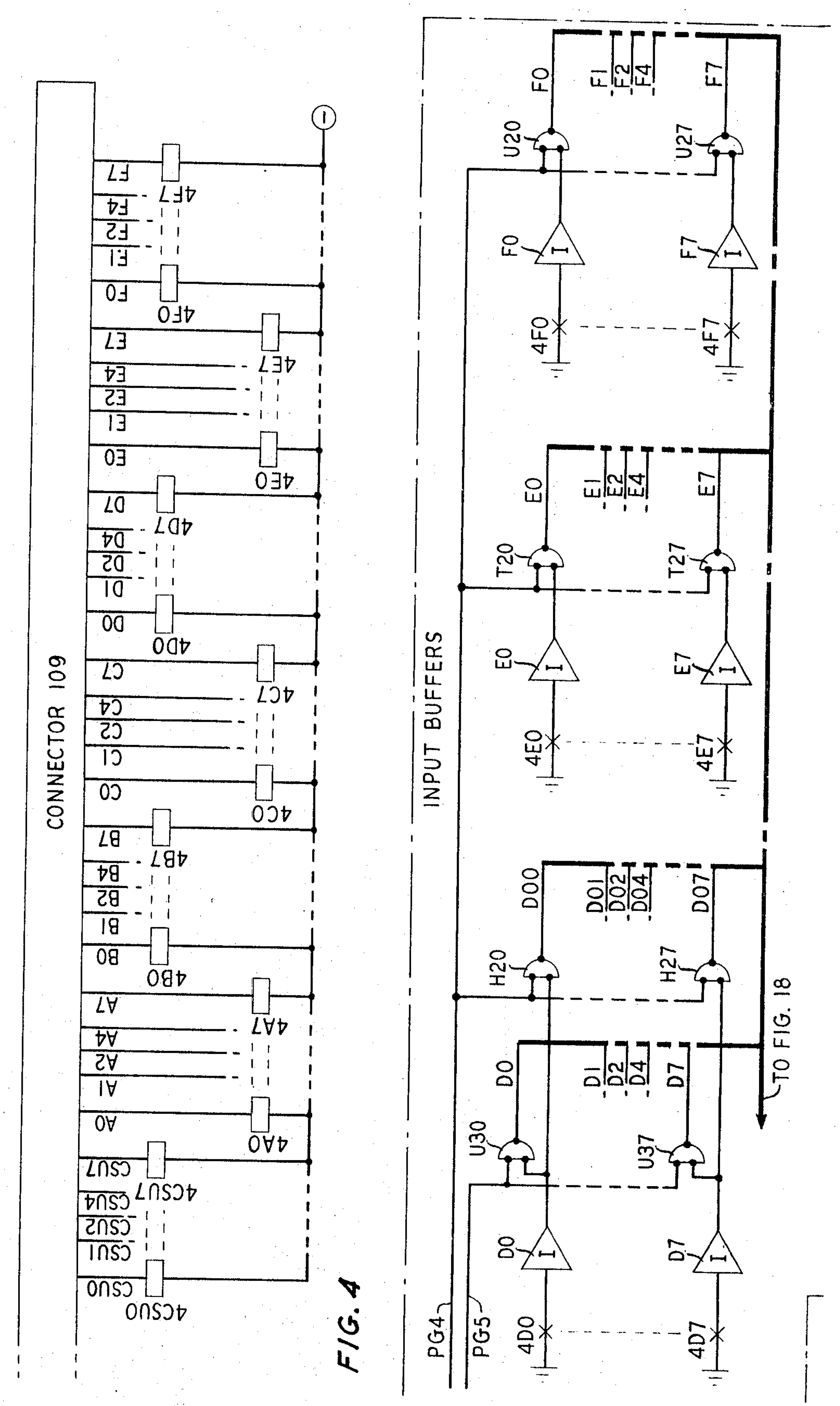

Referring now to FIG. 3, upon receipt of the above information, marker 106 initiates a seizure of an idle route translator 111, via connector 109, by grounding lead ST to operate the 3ST relay. In addition, as shown in FIG. 4, marker 106 transfers the first six digits of the dialed directory number to the route translator in the well-known 2-out-of-5 code format. For example, the first directory digit, hereinafter referred to as the A digit, is transferred by marker 106 placing ground on 2-out-of-5 A(0,1,2,4,7) leads and operating two corresponding route translator 4A(0,1,2,4,7) relays. Operation of 2-out-of-5 4A– relays closes respective 2-out-of-5 4A– make contacts shown in FIG. 3 to ground inputs of 2-out-of-5 of the A– inverters comprising the A digit input buffer. The A digit of the directory number is thus stored for subsequent use in the A digit input buffers wherein the outputs of 2-of-the-5 A– inverters have been changed from normal ground to a battery state. In a like manner, marker 106 transfers the remainder of the first six digits of the directory number into the route translator B through F digit input buffers wherein each digit is stored in the familiar 2-out-of-5 code format within the five inverters comprising each digital input buffer.

Figure 7:
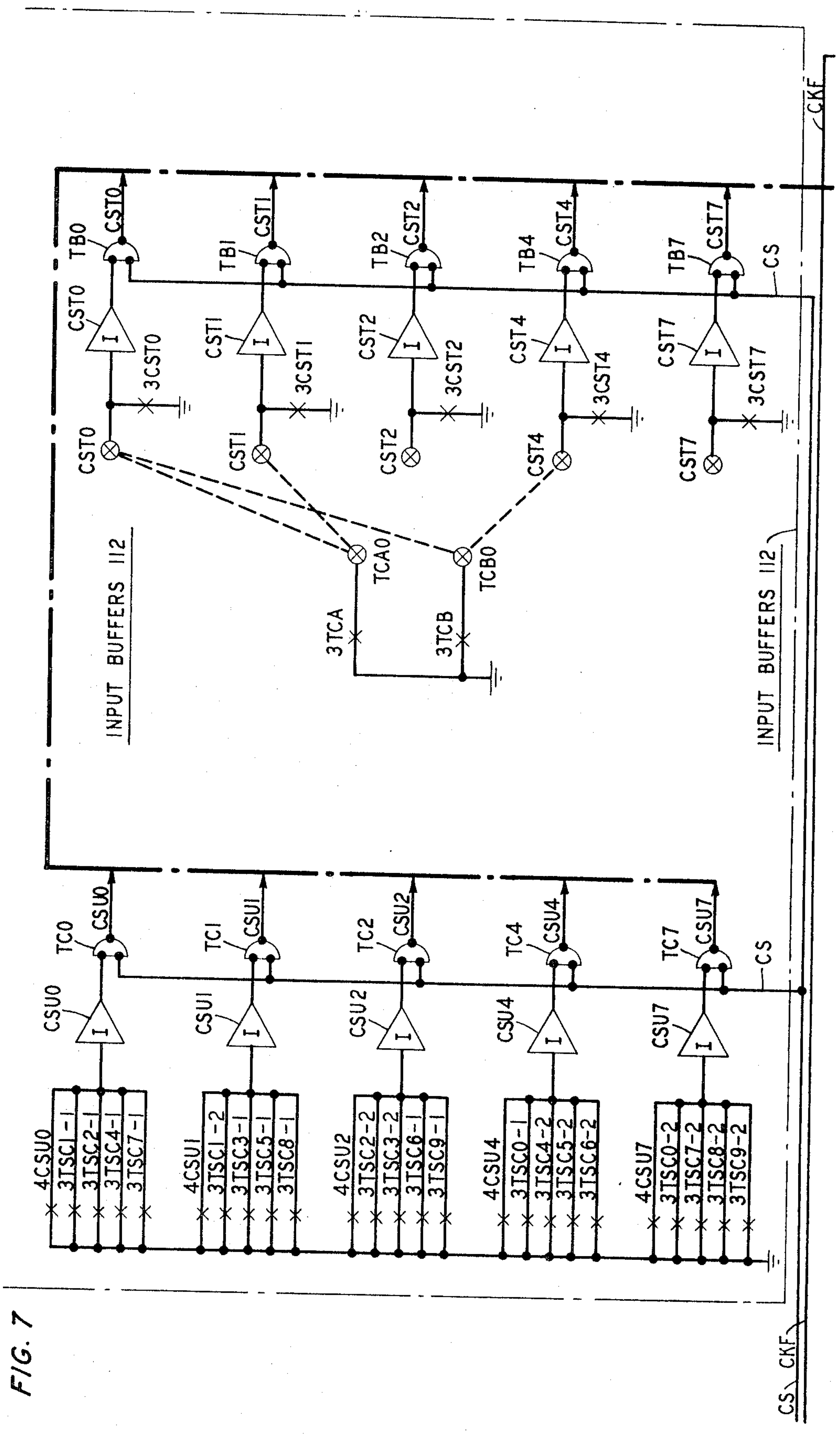
FIG. 7 is a schematic diagram of the class information input buffers.

If the request for service was initiated by subscriber station S1, marker 106 also transfers a two-digit class of service code to the route translator by operating 2-out-of-5 class of service tens 3CST– relays and units 4CSU– relays to register respectively the tens and units digits of the class of service information. As shown in FIG. 7, operation of 2-out-of-5 of the 3CST– and 4CSU– relays results in the closure of their respective 3CST– and 4CSU– make contacts to place ground on 2-out-of-5 of the CST– and CSU– inverters comprising the class of service tens and units input buffers. The two-digit class of service information relating to the class identity of a subscriber station is thus stored in the class of service tens and units input buffers.

A request for service initiated by two-way trunk 104 results in marker 106 transferring the trunk class information to the route translator, via connector 109, by placing ground on either the TCA or TCB leads, FIG. 3, and one of the TSC(0–9) leads. Ground on the TCA or TCB lead operates the corresponding 3TCA or 3TCB relay to ground the TCA0 or TCB0 punching of FIG. 7 through its associated 3TCA and 3TCB make contacts.

The TCA0 and TCB0 punchings are cross-connected to the inputs of the CST– inverters to register the 3TCA and 3TCB relay operations in a predetermined 2-out-of-5 code format. For example, assuming it has been predetermined that the operation of the 3TCB relay should represent the trunk class tens digit 4, punching TCBO will be cross-connected to the CST0 and CST4 punchings. The enabling of make contacts 3TCB will ground the inputs of the CST0 and CST4 inverters thereby registering the 3TCB relay operation as the trunk class tens digit 4 in a 2-out-of-5 code format.

Ground on one of the TSC(0–9) leads of FIG. 3 operates the associated 3TSC(0–9) relay to register the trunk class units information in the route translator. The make contacts of the 3TSC(0–9) relays comprise a translation network shown in FIG. 7 wherein the operation of a specific 3TSC(0–9) relay grounds the inputs to 2-out-of-5 inverters of the class of service units input buffers. Assuming a trunk class the units digit of which is 6, marker 106 grounds lead TSC6 to operate the 3TSC6 relay. The operation of the 3TSC6 relay enables make contacts 3TSC6–1 and 3TSC6–2 to ground inputs to the CSU2 and CSU4 inverters of the class of service units input buffers.

B. Initial Timing Function

Figure 6:
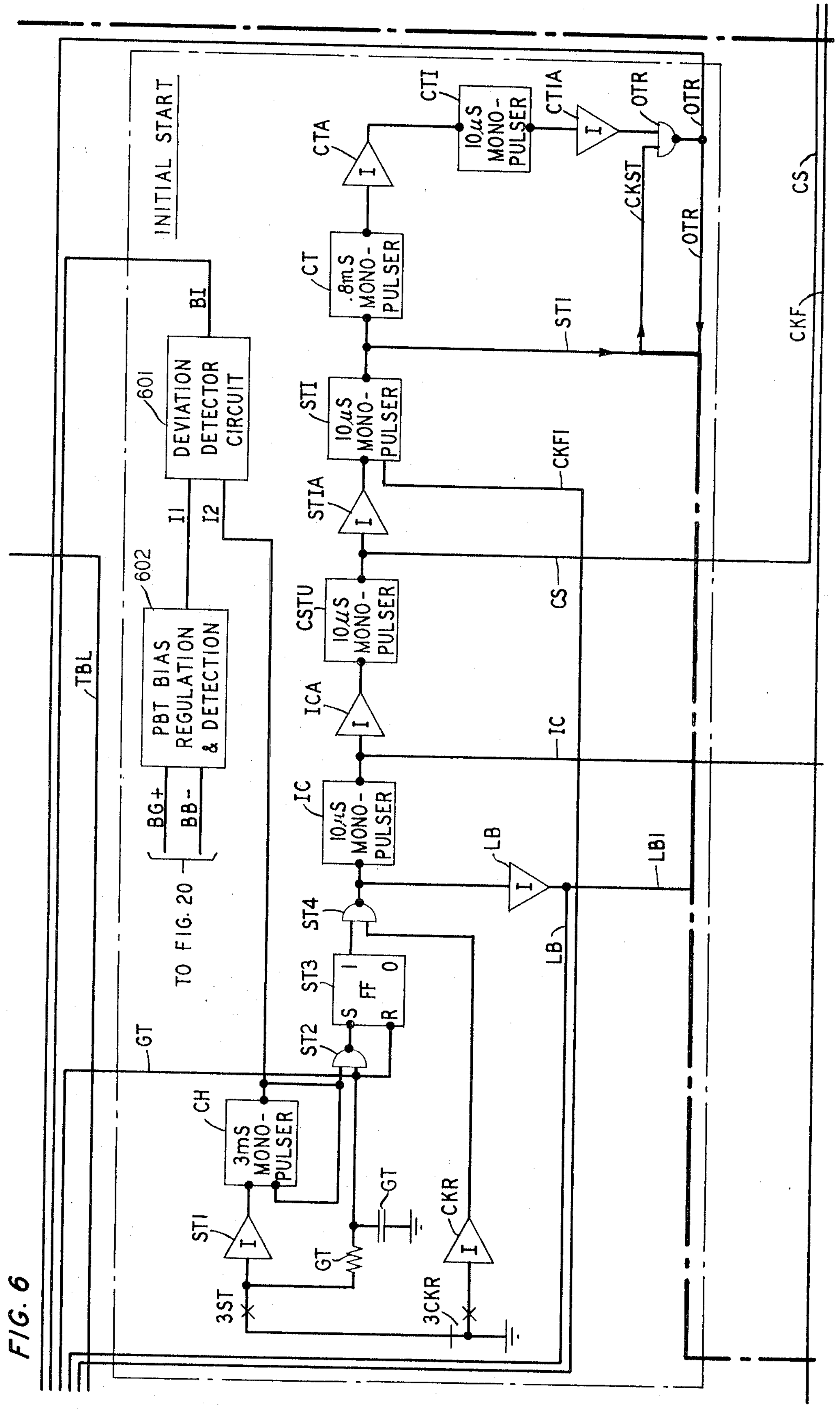
FIG. 6 is a schematic diagram of the initial start circuit.

An initial timing sequence is initiated to assure that the input data relays have had sufficient time to be fully operated at the time the route translator utilizes them in data manipulations. Referring to FIG. 6, the operation of relay 3ST enables make contacts 3ST to ground the input to inverter ST1. The resulting changed output state of inverter ST1 enables the CH monopulser to place battery on its output for 3 milliseconds to clear the deviation detector circuit 601 in order to detect a change in the state of the I1 lead. Capacitor GT starts to discharge to drive the ST2 and BE AND-NOT gate inputs and the reset input of the ST3 flip-flop to ground in approximately 0.92 milliseconds. At the end of 3 milliseconds monopulser CH times out and returns its respective output to ground.

Figure 20:
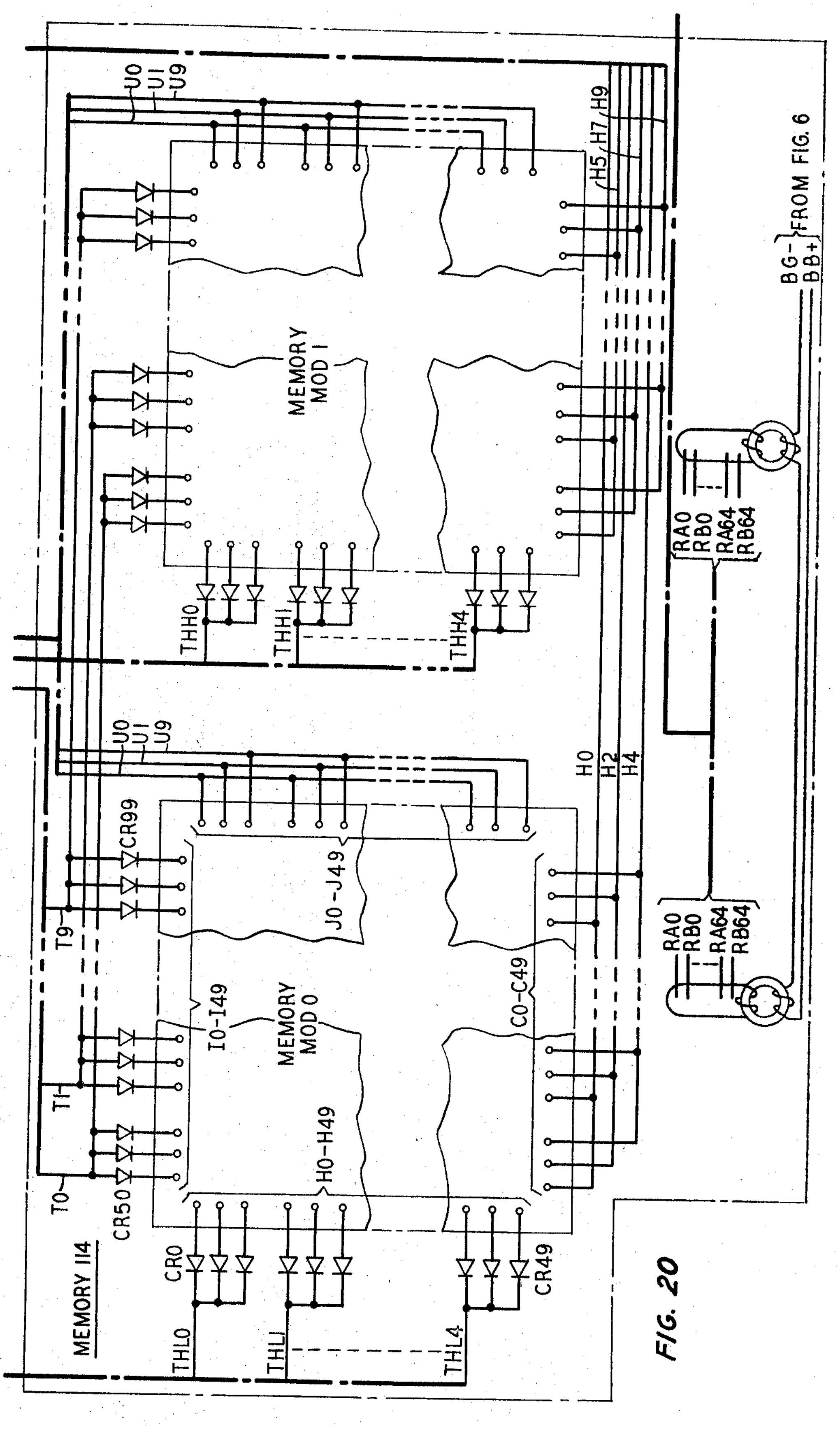

The PBT bias regulation and detection circuit 602 provides a regulated 4 ampere current over leads BG and BB to the bias winding of the memory shown in FIG. 20. If the bias current varies more than ±3 percent from the nominal value of 4 amperes, the deviation detector 601 will ground lead BI. A ground on both BI and GT leads sets AND-NOT gate BE of FIG. 5.

Concurrent with the time out of monopulser CH both inputs to AND-NOT gate ST2 are at ground and gate ST2 will operate. The enabling of AND-NOT gate ST2 sets the ST3 flip-flop to the 1 state to ground the corresponding input to AND-NOT gate ST4. With relay 3CKR released, gate ST4 is enabled to operate the LB inverter and removed locking battery from the LB and LB1 leads to FIGS. 5 and 12 and then from the OT, BE1, and CKF1 trouble indicating flip-flops, and the TRRL, IN, CD, and CPW control flip-flops.

Figure 5:
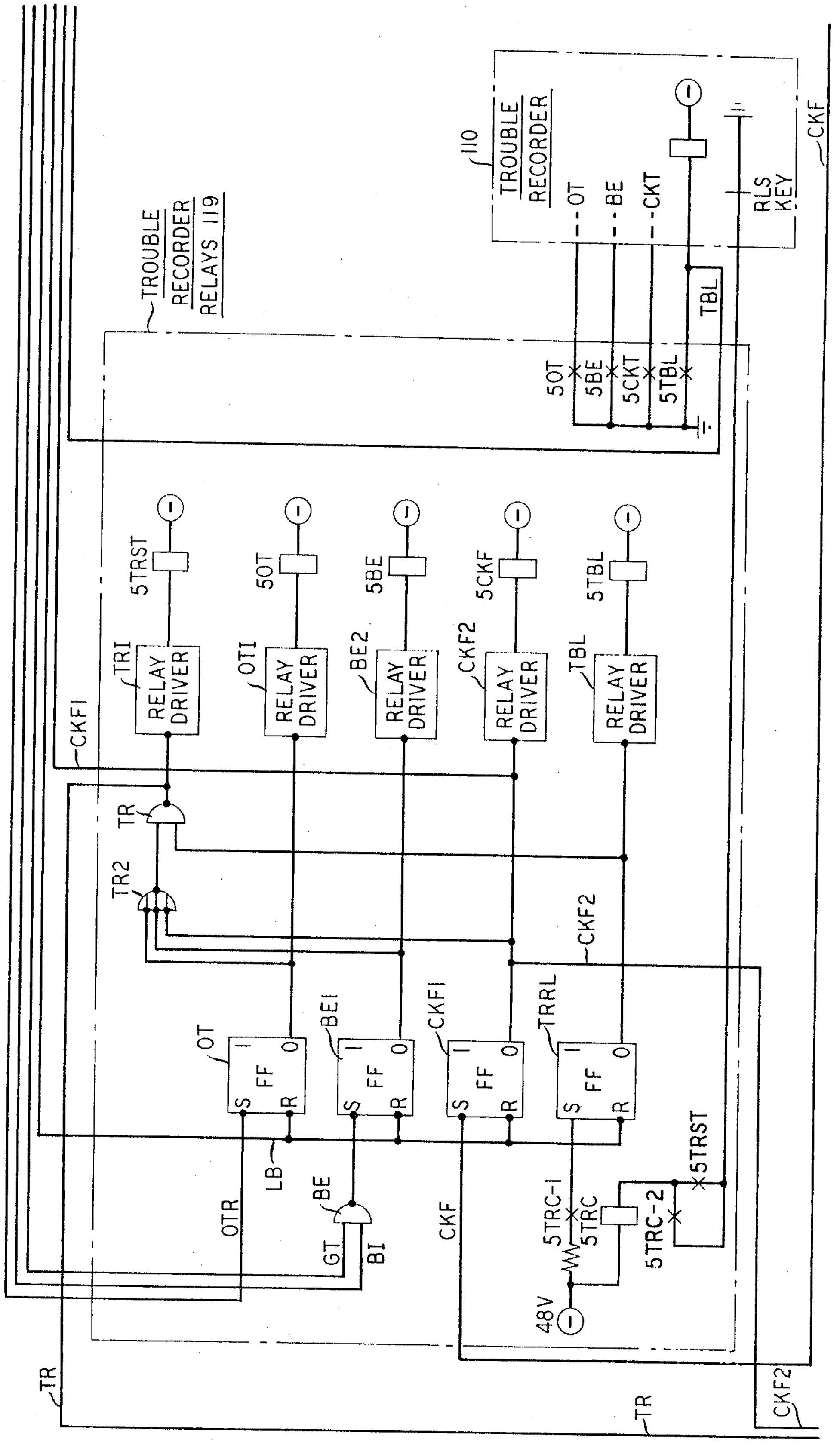
FIG. 5 is a schematic diagram of the trouble recorder relays.

As shown in FIG. 5, the removal of locking battery from the bias error flip-flop BE1 permits a trouble release function to be initiated if gate BE has been previously enabled. The enabling of gate BE sets the BE1 flip-flop to the 1 state. With flip-flop BE1 set to 1, the BE2 relay driver is enabled to operate the 5BE relay. The closing of make contacts 5BE grounds the BE lead through the make 5BE contacts to trouble recorder 110 as an indication that the memory bias current is out of range.

Referring again to FIG. 6, operation of the ST4 gate also enables the IC monopulser to operate for a period of 10 microseconds to clear all system registers. With the IC monopulser turned "ON," battery is applied over the IC lead to FIG. 10 to clear the index and customer registers by resetting the ID– and the CC– flip-flops to the 0 state. Battery on the IC lead also enables the OR gates PG20 and PG22 of FIG. 9 to place battery on leads PG20 and PG22, respectively.

Figure 11:
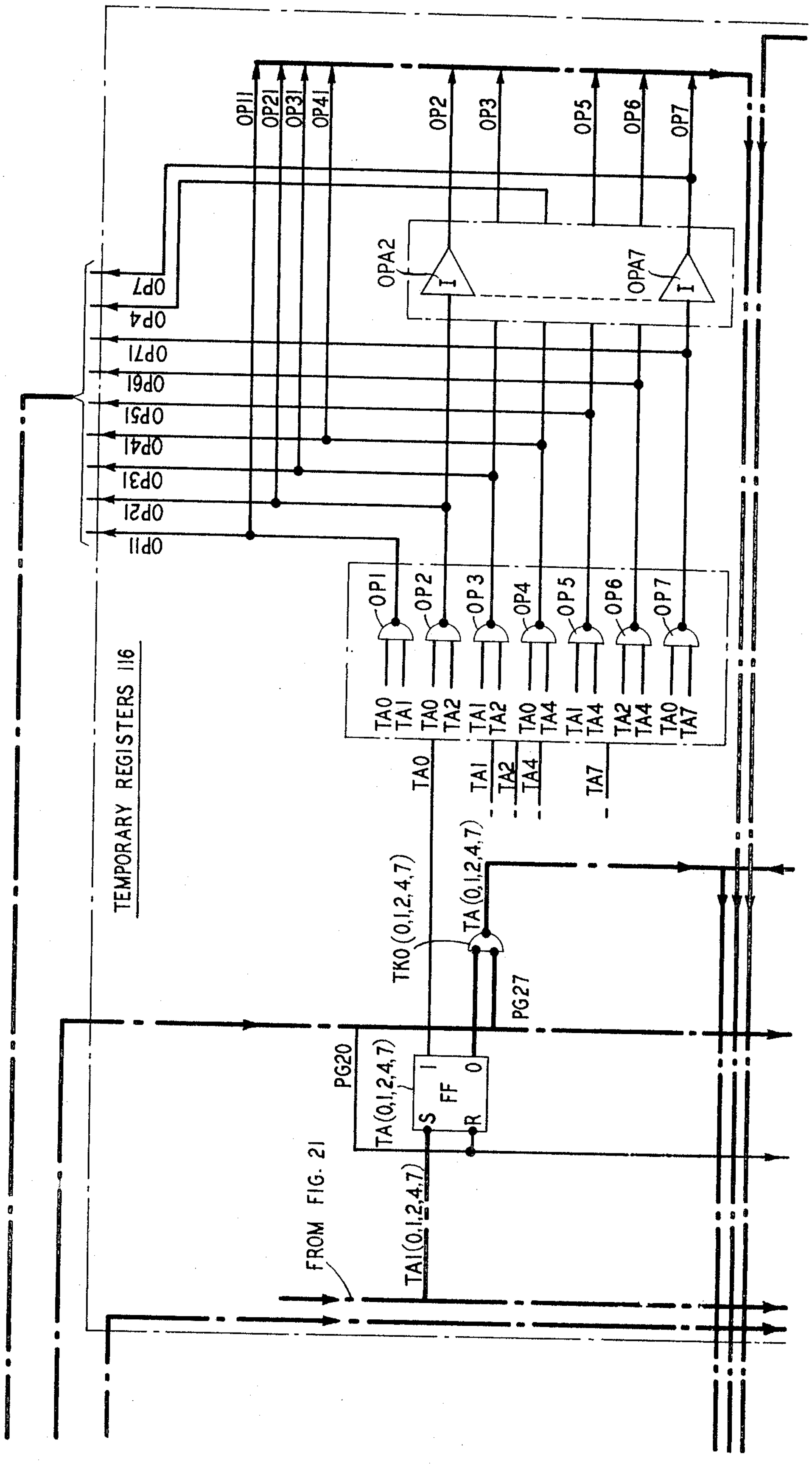
FIGS. 11 and 15 are a schematic diagram of the temporary registers.
Figure 15:
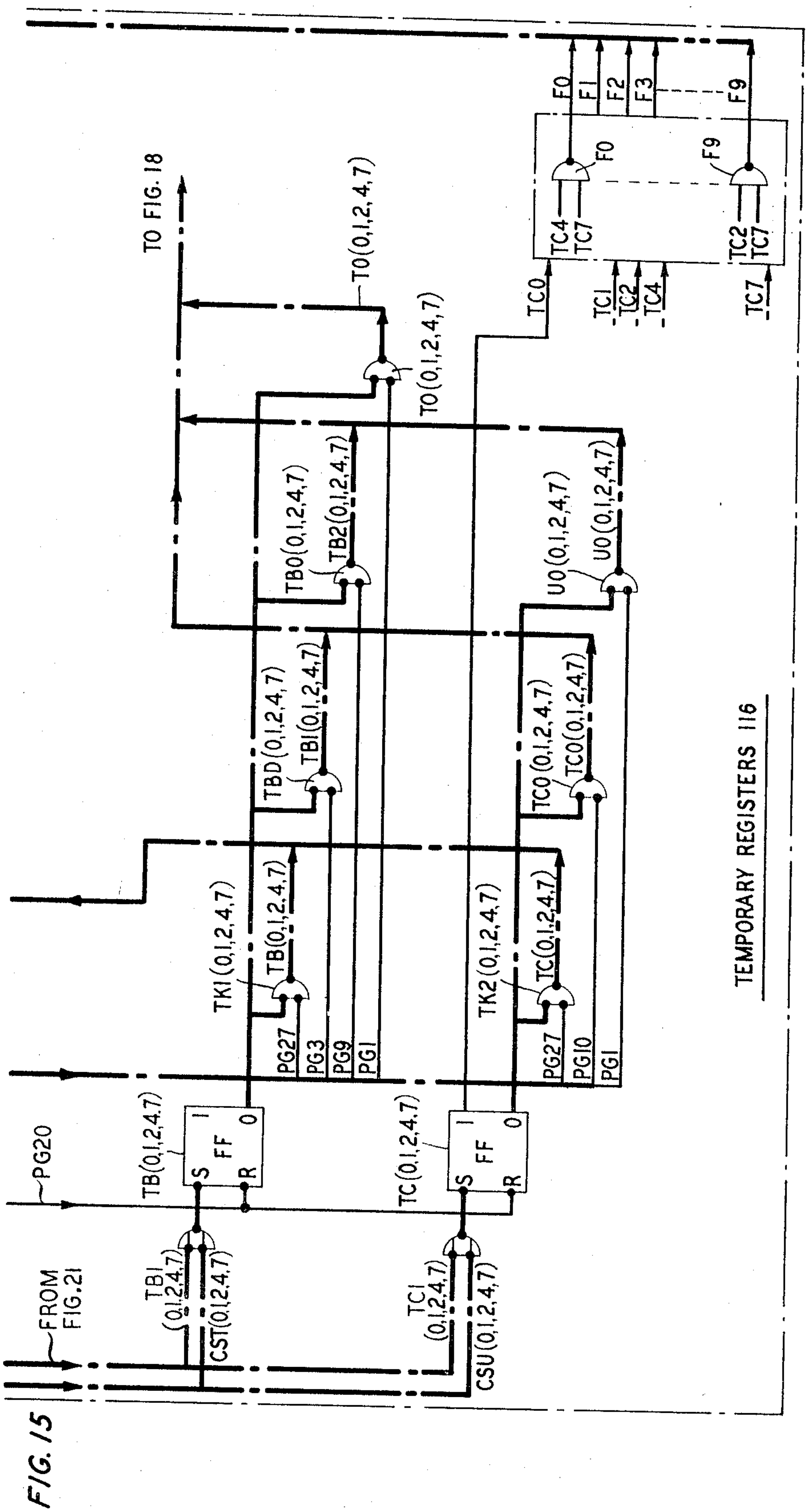
Figure 21:
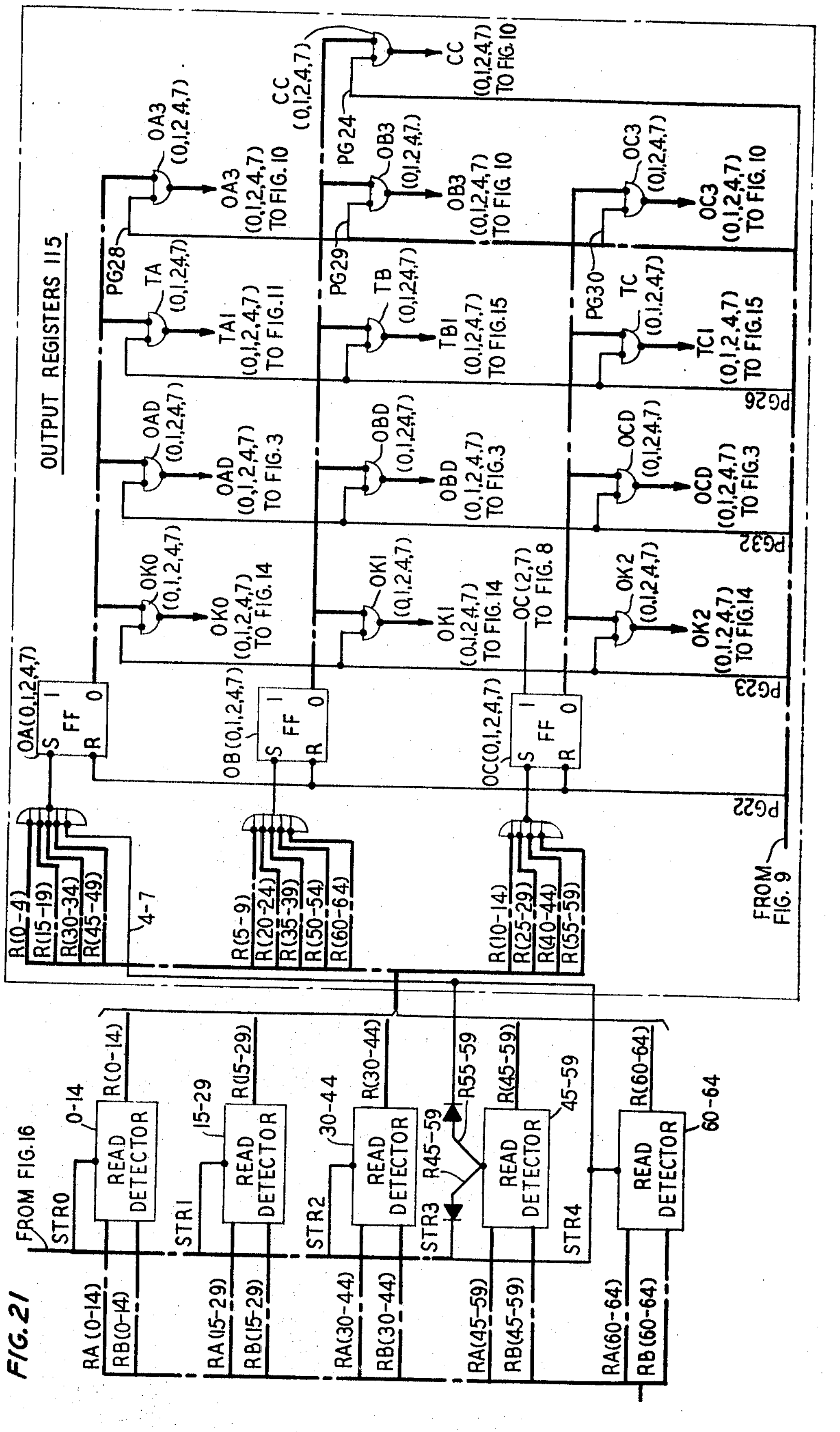
FIG. 21 is a schematic diagram of the read detectors and output register.

Battery on leads PG20 and PG22 to FIGS. 11, 15, and 21 clears the temporary and output registers by setting their respective TA–, TB–, TC–, OA–, OB–, and OC– flip-flops to the 0 state. The IC lead also enables OR gates CLAR and CLS of FIG. 13 to place battery on the CLAR and CLS leads to FIGS. 18 and 17 to clear the TH–, HN–, T–, and U– flip-flops of the address register and the S0, S1, S2, S3, and S4 sector registers.

During the period prior to the operation of the IC monopulser, the ICA inverter output was maintained at battery for a relatively long period of time and the CSTU monopulser remained in the quiescent state. When the IC monopulser was turned on, the ICA inverter output was grounded and the CSTU monopulser was recycled so that concurrent with the turn off of the IC monopulser and the return of the inverter ICA output to the battery state, the CSTU monopulser turns on and places battery on the CS lead to FIG. 7.

Battery applied to the inputs of AND-NOT gates TC– and TB– enables the transfer of the class of service or the trunk class information stored in input buffers CST– and CSU– to the respective temporary register TB– and TC– flip-flops.

Figure 14:
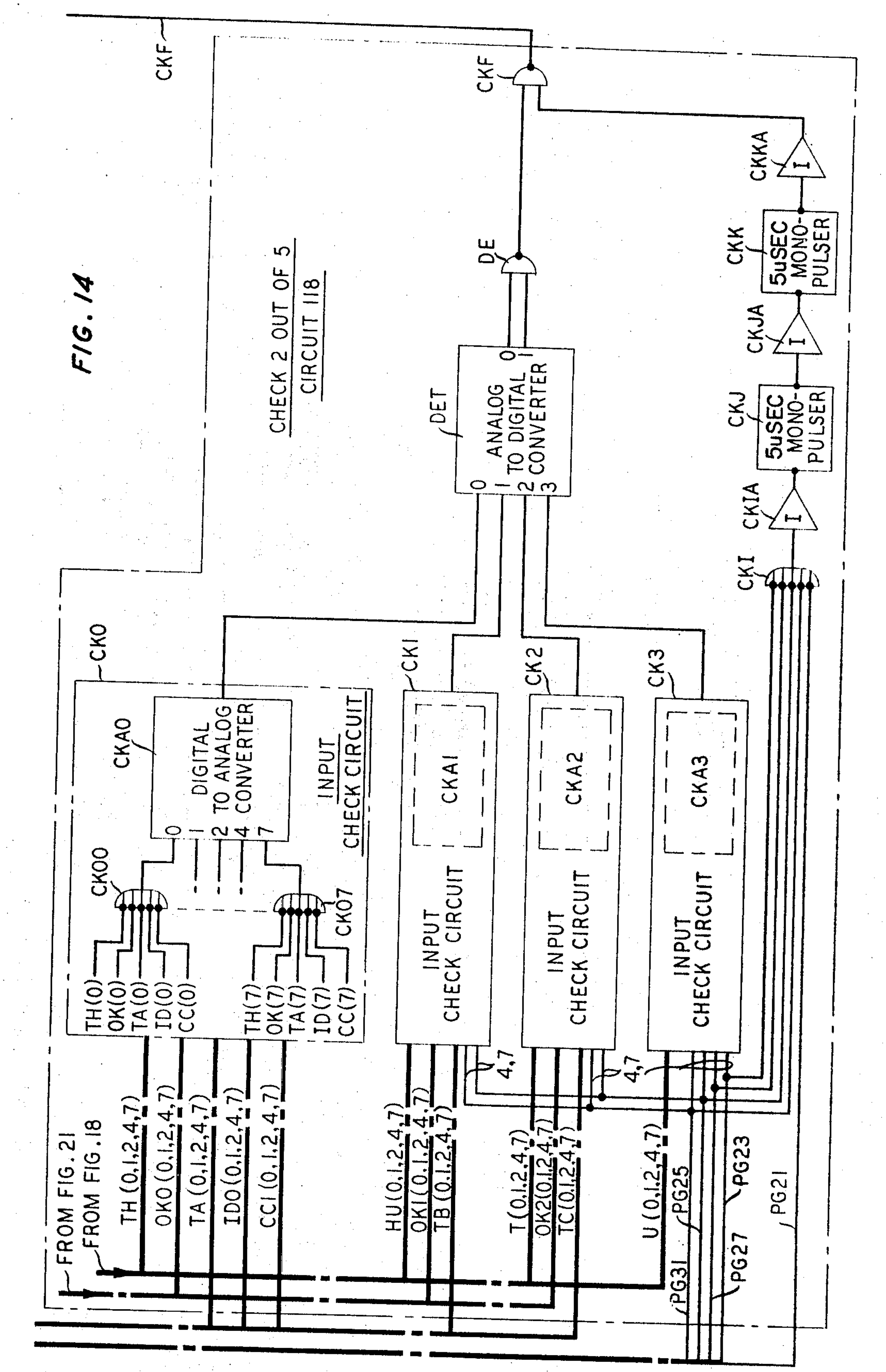
FIG. 14 is a schematic diagram of the 2-out-of-5 check circuit.

After 10 microseconds the CSTU monopulser returns to the quiescent state and places battery on an input to the STI monopulser via the STIA inverter. Provided that the 2-out-of-5 check circuit 118 of FIG. 14 is not in the failed state, the monopulser STI turns on for 10 microseconds. Battery on the ST1 lead sets both the clock power CPW and the clock driver CD flip-flops of FIG. 12 to the 1 state. Ground on the 1 lead of the CPW flip-flop enables the power stages of the clock ring counters RC1, RC2, and RC3. The setting of the CD flip-flop initiates the subsequent starting of the ring counter clock.

The operation of the STI monopulser also enables the CT monopulser to analyze the overall clock timing function. After 0.8 milliseconds, the turn off of monopulser CT enables the CTI monopulser to operate the CT1A inverter to ground an input of AND-NOT gate OTR for a period of 10 microseconds. If the clock is still running, ground on the CKST lead enables gate OTR to operate and place battery on lead OTR. Battery on the OTR lead resets the clock driver flip-flop CD of FIG. 12 to stop the running of the clock and in addition sets the trouble indicating OT flip-flop of FIG. 5 to the 1 state. The resulting battery applied to the input of relay driver OT1 operates the 50T relay to ground the OT lead through the enabled 5OT make contacts to trouble recorder 110 as an indication of clock timing error.

Summarizing, at this time, seizure of route translator 111 initiates an initial timing sequence wherein a check is completed on the status of the bias current to the memory and all the system registers are cleared prior to receipt of new data. In addition, locking battery is removed from all of the trouble indicating and control flip-flops. The class of service (or, in the alternative, the trunk class) is thereupon gated into the temporary register. Finally, the clock is furnished with power, given a start signal, and is subjected to a check on clock performance.

Figure 12:
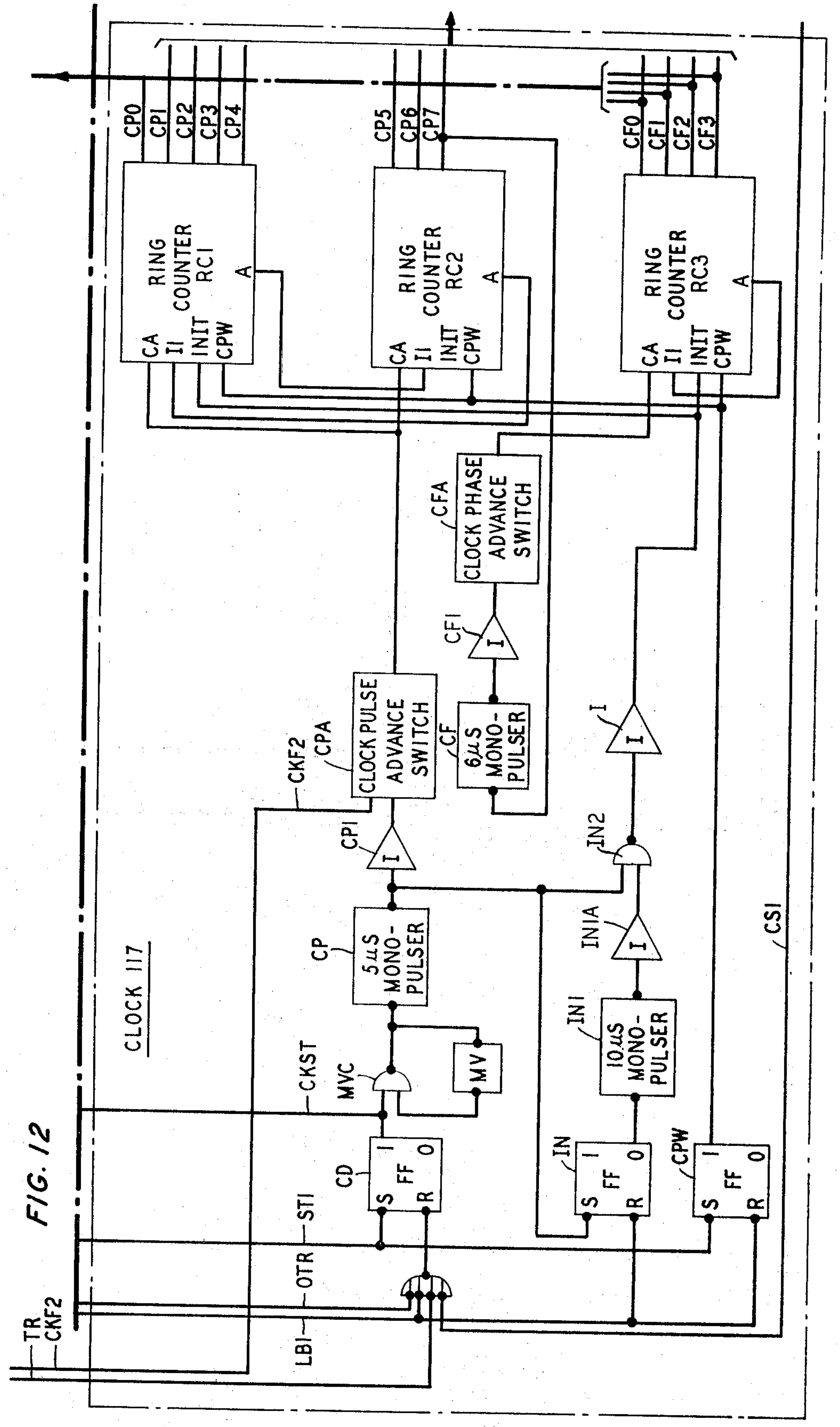
FIG. 12 is a schematic diagram of the clock.

C. Clock (FIG. 12)

Battery on the ST1 lead sets the CD flip-flop to the 1 state, thereby grounding in input of AND-NOT gate MVC and CKST lead as an indication that the clock circuit is running. In the absence of a start clock indication, battery on the CD flip-flop 1 lead keeps gate MVC turned off. The resulting ground output locks the MV multivibrator in the off position, thereby assuring a ground output to the corresponding input of gate MVC.

Setting the CD flip-flop to the 1 state turns gate MVC on and removes ground from the input of multivibrator MV. After 10 microseconds multivibrator MV times out and places battery on an input of gate MVC. Gate MVC turns off and grounds the input to multivibrator MV. With the input grounded, multivibrator MV returns to the locked state in 10 microseconds and grounds an input to gate MVC. Gate MVC is again turned on and another chain of pulses is initiated through the operating combination of AND-NOT gate MVC and multivibrator MV. It is readily seen that as long as the CD flip-flop is set to the 1 state, a 10 microsecond square wave is applied to the input of monopulser CP.

Battery on the input enables monopulser CP to supply battery for 5 microseconds to the inputs of the CP1 inverter and the IN flip-flop. In the absence of locking battery on the LB1 lead, the IN flip-flop is set to the 1 state. The resulting battery on the 0 output terminal turns on monopulser IN1 to enable inverter IN1A to ground the corresponding input of AND-NOT gate IN2 for 10 microseconds. After 5 microseconds, the CP monopulser times out and enables gate IN2 during the remaining turn on time of the IN1 monopulser.

The enabled AND-NOT gate IN2 turns on the I inverter to ground the initialize input terminal INIT of the clock ring counters RC1 and RC3. Initialization of the clock circuit occurs at the beginning of each call and results in the grounding of the CFO and CPO clock output leads. The clock ring counters RC1, 2, and 3 are a combination of the well-known ring counter circuit disclosed by the prior art and need not be described in detail here.

While monopulser CP is turned on, inverter CP1 grounds one of the two inputs to the CPA counter pulse advance switch. In the absence of a 2-out-of-5 check failure, the CKF2 lead is grounded and the CPA counter pulse advance switch is turned off, thereby removing battery from the counter advance CA terminals of clock ring counters RC1 and RC2.

The ring counter starts the clock pulsing sequence by grounding the CFO clock phase lead and the CPO clock pulse lead. The ground remains on these leads for 15 microseconds. At the end of that period, CPA switch removes battery from the CA terminal of ring counters RC1 and RC2, thereby causing the clock to advance by grounding the CP1 lead and removing ground from the CPO lead. This sequence continues until lead CP4 has been grounded. The next clock advance of RC1 momentarily places battery on terminal A of ring counter RC1 over an obvious connection to terminal I1, of ring counter RC2, thereby causing the clock to advance and ground clock pulse lead CP5.

The clock ring counters continue to advance grounding each of the clock leads in numerical succession. With clock pulse lead CP7 grounded, the next clock pulse advance signal momentarily places battery on terminal A of ring counter RC2, thereby causing the clock to advance and ground clock pulse lead CP0.

In addition, removal of ground on lead CP7 enables the CF clock phase monopulser to operate for a period of 6 microseconds, thereby turning the counter phase advance CFA switch off and removing battery from the CA terminal of the clock ring counter RC3. This action results in a clock advance whereby ground is removed from clock phase lead CF0 and placed on lead CF1. Thus leads CF1 and CP0 are grounded at this time.

The clock ring counters continue to advance in the manner described until both leads CF3 and CP6 have been grounded. Ground on these leads enables AND-NOT gate R32A of FIG. 13 to place battery on the CS1 lead to the clock drive flip-flop CD to stop the clock by resetting CD to the 0 state.

D. Customer Service Index Translation

The route translator utilizes the class of service information on originating calls and the trunk class on incoming calls to obtain a customer service digit from the customer identification table located in the first matrix of 1,000 words. The customer service digit identifies the particular block of information wherein a specific customer's ABC translation table is located.

As earlier described, during the initial timing sequence, the tens and units class information is gated into the temporary register TB– and TC– flip-flops on a 2-out-of-5 basis by the operation of the CSTU monopulser.

Figure 8:
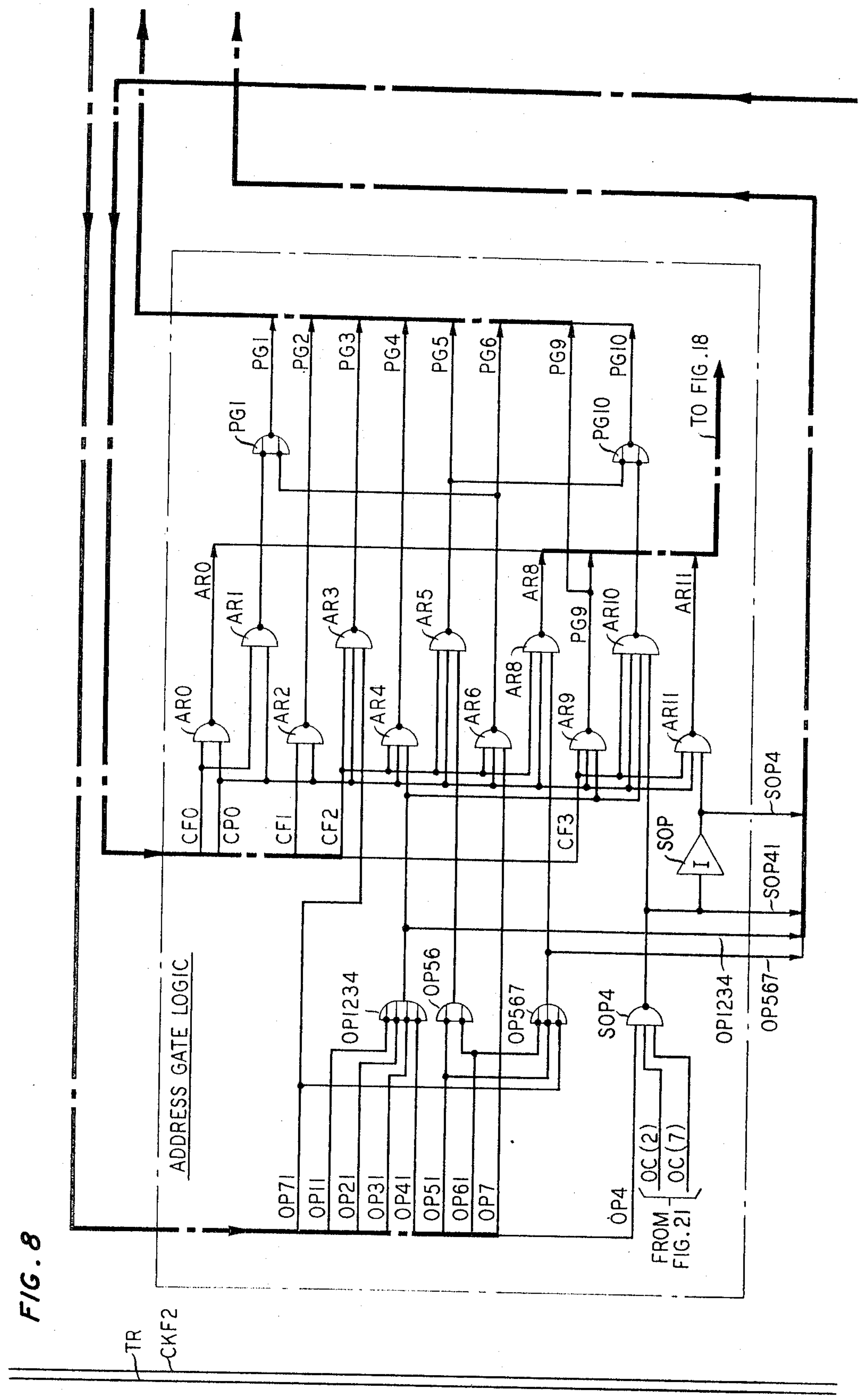
FIG. 8 is a schematic diagram of the gating logic for the address register.

Ground on the clock leads CF0 and CP0 to FIG. 8 enables AND-NOT gates AR0 and AR1 to place battery on their respective output leads. Battery on the AR0 lead to FIG. 18 sets the TH4, TH7, HN4, and HN7 flip-flops to the 1 state to register the digit 0 in the thousands and hundreds positions of the address register.

Figure 18:
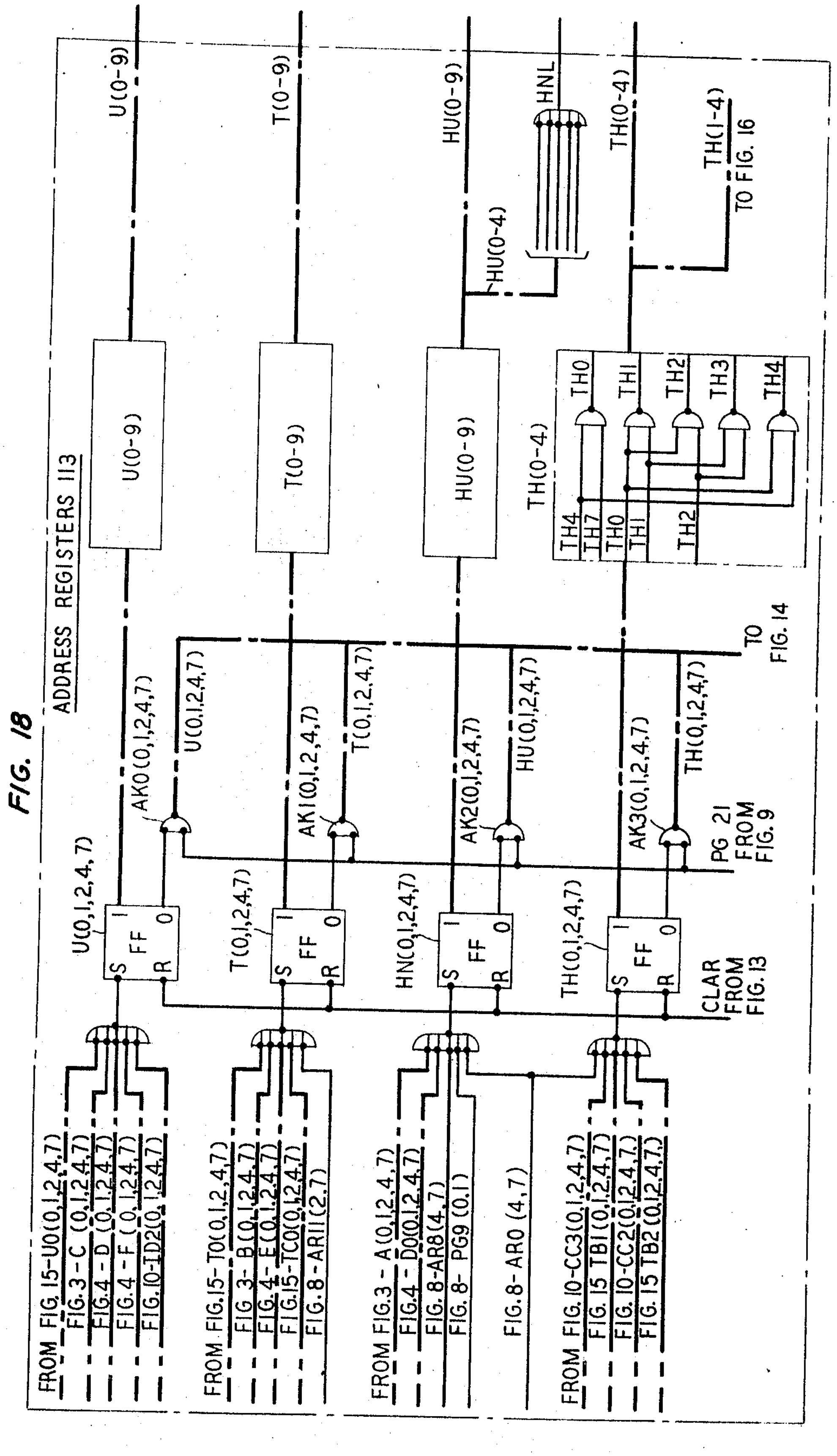
FIG. 18 is a schematic diagram of the address register.

Referring again to FIG. 8, battery applied to the input of OR gate PG1 removes resistance ground on the PG1 lead to FIG. 15 and replaces it with battery to enable AND gates TO– and UO– to transfer the class tens and units data stored in temporary registers TB– and TC– flip-flops into the address register T– and U– flip-flops of FIG. 18. The address register now contains the complete memory address required for the first memory read, in that the address register TH4,7 and HN4,7 flip-flops have been set in the 2-out-of-5code format to represent the numerical digit 0 and the T– and U– flip-flops contain the class tens and units information.

After 15 microseconds, the ground on lead CP0 is removed and all nonlocking circuits, such as gates, are released. The clock then advances to ground clock pulse lead CP1. Ground on both CF0 and CP1 leads to FIG. 17 enables AND gate S4B to set sector register S4 to the 1 position. With flip-flop S4 set, battery is supplied via the S4 lead to an input of the STR4 strobe amplifier of FIG. 16.

Figure 9:
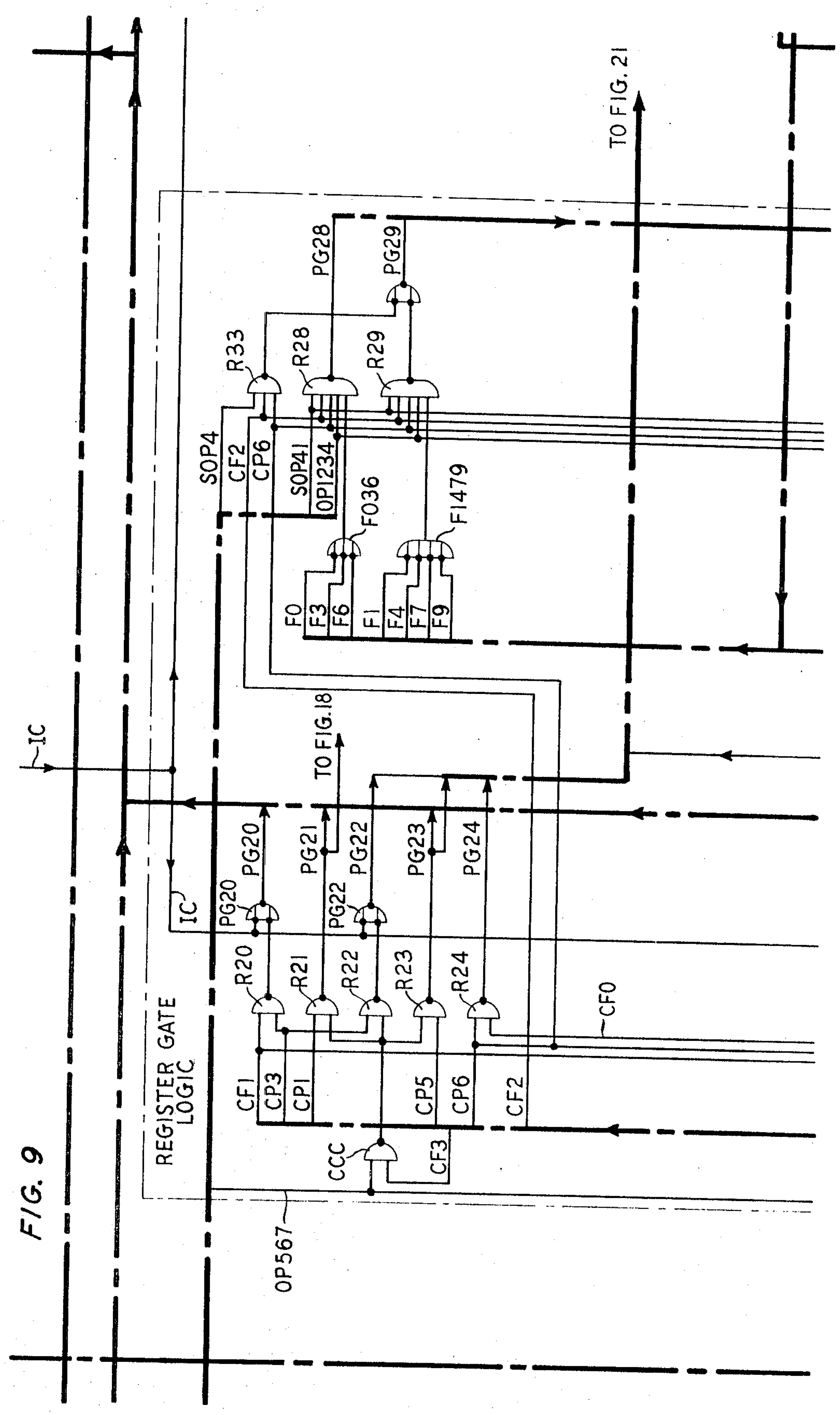
FIGS. 9 and 13 are a schematic diagram of the gating logic for the output and temporary registers.

Battery on the CF3 lead to FIG. 9 ensures that the AND-NOT gate CCC output remains at ground. Ground on the CP1 lead operates AND-NOT gate R21 to place battery on lead PG21 to FIG. 18 to enable gate circuits AK– to thereby gate the previously stored data in the address register to the 2-out-of-5 check circuit 118 of FIG. 14.

E. 2-Out-of-5 Check Circuit (FIG. 14)

The normal mode of operation requires that 2-out-of-the-5 NOT-OR gates of each of the check input circuits CK0,1,2,3 be operated for each valid digit input. In the quiescent state with no inputs, all check input circuit NOT-OR gates are disabled in order that their respective output may supply battery to the inputs of digital-to-analog converters designated CKA0,1,2,3.

With battery on all inputs, the digital-to-analog converters maintain their respective output voltage at approximately −48 volts. If any one NOT-OR gate of any one input check circuit is operated, its output will ground the respective input of the associated digital-to-analog converter and thereby increase the respective output voltage to approximately −35 volts. Similarly, if any two NOT-OR gates are operated, their grounded output leads enable the digital-to-analog converter to increase its output voltage to approximately −22 volts. The operation of three or more NOT-OR gates of any single input check circuit increases the output voltage to −9 volts or more. Thus the digital-to-analog converter circuits CKA0,1,2,3 convert the binary input information into an analog signal output voltage.

When valid digits are gated into the input check circuits CK0,1,2,3, 2-out-of-5 NOT-OR gates enable the CKA0,1,2,3 digital analog converter circuits to apply a negative voltage of 22 volts to each of the four inputs of the 2-out-of-5 detector DET. DET may be any type of analog-to-digital converter circuit arranged to detect an error in the 2-out-of-5 format recorded in any one of the input check circuits CK(0,1,2,3). If the DET circuit detects a voltage more negative than −22 volts on any one of the input terminals 0,1,2,3 output 0 is changed to battery, thereby indicating a 2-out-of-5 check failure has occurred. Similarly, an input voltage more positive than −22 volts enables the DET circuit to place battery on the 1 output again indicating a 2-out-of-5 check failure. For a valid check, all of the DET circuit input terminals must be −22 volts in order for both the 0 and 1 outputs to be ground. Thus an invalid 2-out-of-5 format in any one of the input check circuits CK0,1,2,3 results in a battery input to AND-NOT gate DE. If all input check circuits record a valid 2-out-of-5 format, both inputs to gate DE are grounded.

Battery on lead PG21 of FIG. 14 enables NOT-OR gate CKI to operate inverter CKIA to apply battery to an input of the monopulser CKJ. The operation of the CKJ monopulser for 5 microseconds allows sufficient time for the operation of all the various stages of the 2-out-of-5 check circuit. When monopulser CKJ times out, the return of the CKJA inverter output to battery enables monopulser CKK to operate for 5 microseconds and ground an input of AND-NOT gate CKF via inverter CKKA.

If a valid 2-out-of-5 check has been obtained, both inputs to AND-NOT gate DE are grounded as earlier described and gate DE operates to apply battery to AND-NOT gate CKF. Thus gate CKF is prevented from operating and the clock circuit advances one pulse.

An invalid 2-out-of-5 check results in one of the inputs to gate DE being battery. Gate DE is inhibited from operating and the resulting ground output is applied to the input of gate CKF. Thus the enabling of AND-NOT gate CKF by the CKK monopulser operates gate CKF to apply battery to the CKF lead. Battery on lead CKF sets the CKF1 flip-flop of FIG. 5 to the 1 state and places battery on the 0 output to the input of relay driver CKF2 to operate relay 5CKF to ground the CKT lead through the 5CKT make contacts to trouble recorder 110 as a 2-out-of-5 check failure indication.

The setting of the CKF1 flip-flop also places battery on the CKF1 and CKF2 leads to the inputs of the ST1 monopulser and the clock pulse advance switch CPA. Battery applied to the input of the CPA switch of FIG. 12 via the CKF2 lead keeps CPA turned on and prevents the further advance of clock ring counter circuits RC1 and RC2. The battery on the CKF1 lead to the input of the STI monopulser of FIG. 6 prevents STI from restarting the clock until the 2-out-of-5 check failure circuit has been cleared.

Figure 16:
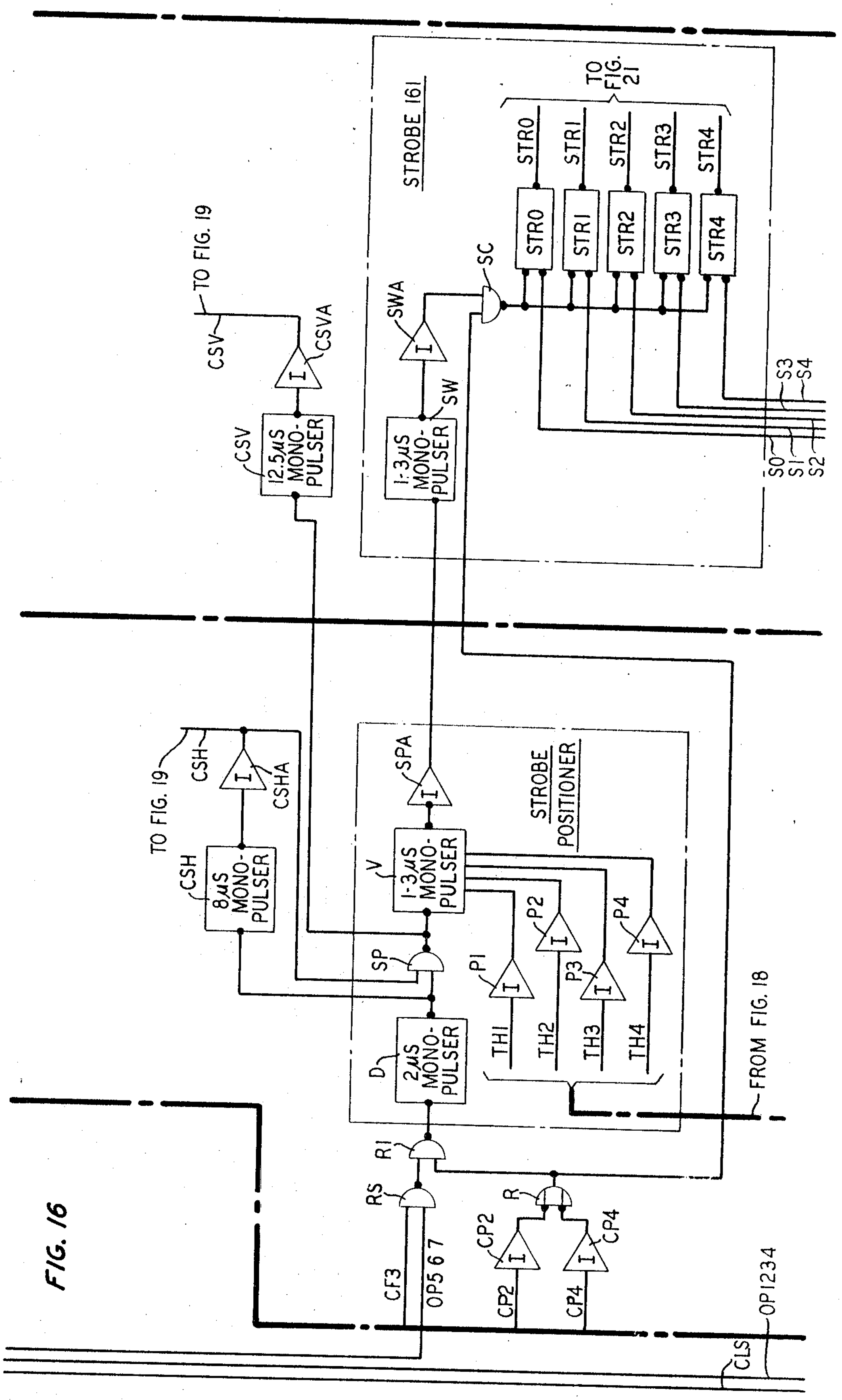
FIG. 16 is a schematic diagram of the strobe and strobe positioner.

F. Memory Read (FIG. 16)

Assuming that the 2-out-of-5 check is passed successfully, the clock advances and grounds the clock pulse lead CP2.

Ground on the CP2 lead enables the CP2 inverter to operate NOT-OR gate R and ground inputs of AND-NOT gates R1 and SC. Battery on clock phase lead CF3 prevents the read stop AND-NOT gates RS from operating at this time. With gate RS inhibited both inputs of AND-NOT gate R1 are ground and gate R1 operates to place battery on the input of monopulser D.

The operation of the D monopulser simultaneously turns on monopulser CSH and inhibits the strobe position AND-NOT gate SP for a period of 2 microseconds. This operation is necessary so that the horizontal read current may be applied to memory prior to the application of the vertical read current in order to minimize memory shuttle noises.

Previously the TH4 and TH7 flip-flops of the address register of FIG. 18 had been set to the 1 state thereby grounding leads TH4 and TH7. Ground on these two leads enables AND-NOT gate TH0 to place battery on lead TH0 to FIG. 19.

Similarly the address register HN4 and HN7 flip-flops had been set to the 1 state thereby grounding leads HN4 and HN7 to turn on AND-NOT gate HU0 to place battery on the HU0 lead and the input of NOT-OR gate HNL. The class information tens and units digits stored in address register T– and U– flip-flops grounds 2-out-of-the-5 T– and U– leads. The grounding of these leads enables the respective AND gates T(0–9) and U(0–9) corresponding to the class information digits registered in the address register.

Figure 19:
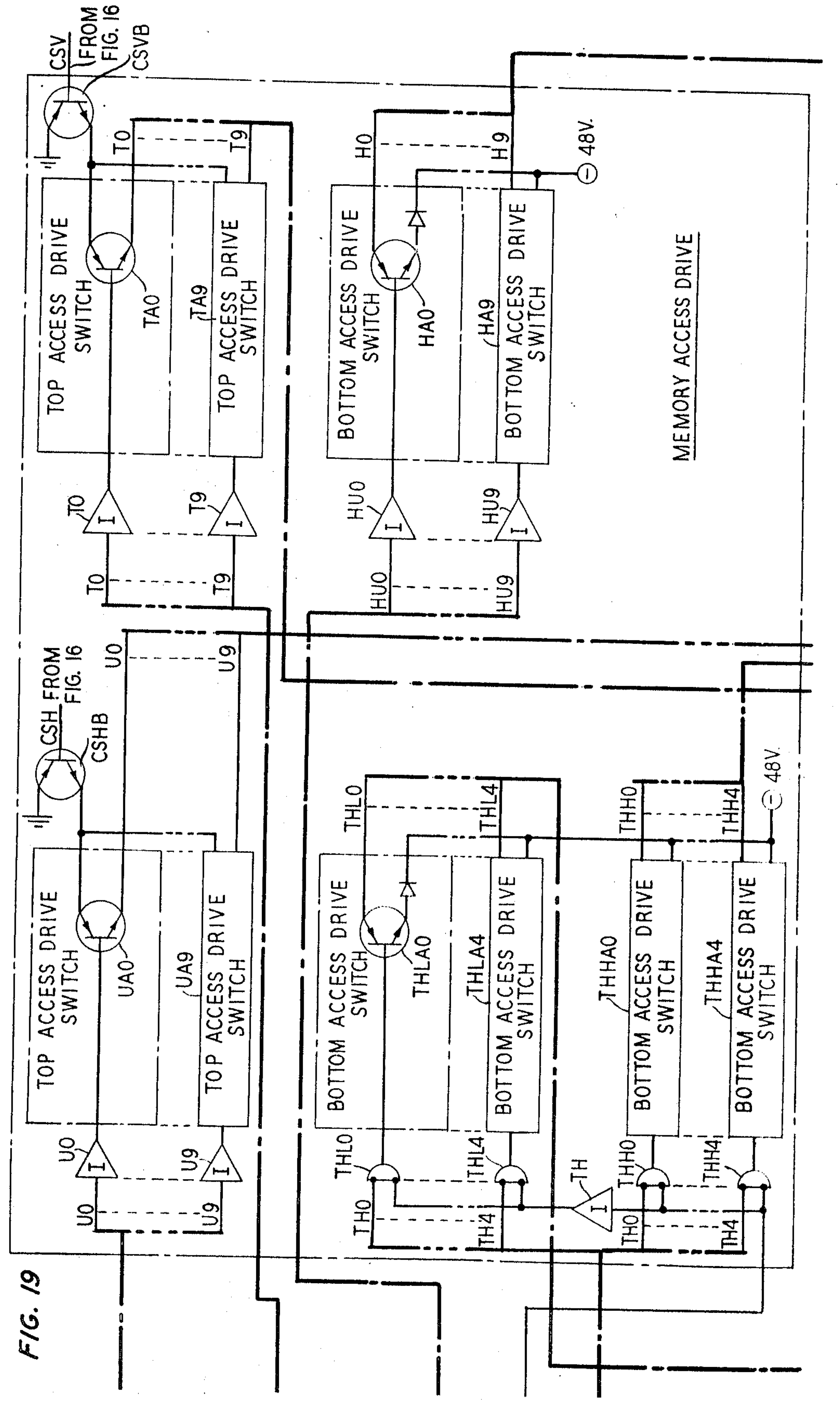
FIGS. 19 and 20 are a schematic diagram of the memory and associated memory access control circuit.

Battery on the HU0 lead enables NOT-OR gate HNL to ground lead HNL to the inputs of the THH(0–4) AND-NOT gates and inverter TH of FIG. 19. Inverter TH in turn places battery on the inputs of AND-NOT gates THL(0–4). The battery on lead TH0 enables AND-NOT GATE THL0 to change its respective output terminal to ground and turn on the THLA0 access switch. Operation of one of the U(0–9) AND gates applies battery to its respective U(0–9) lead to enable the associated U(0–9) inverter to turn on the corresponding access drive UA(0–9) switch. In a similar manner, the operation of one of the T(0–9) AND-NOT gates and the operation of AND-NOT gate HU0 results in the turning on of one of the TA(0–9) access drive switches and the HA0 access drive switch.

The operation of the CSH monopulser of FIG. 16 grounds the CSH lead, via the CSHA inverter, to operate the current switch CSHB of FIG. 19 for a period of 8 microseconds. Concurrently with the operation of the CSHB current switch, horizontal access current flows from ground through the operated switch CSHB to the priorly operated UA(0–9) access switch over the associated U(0–9) lead to memory module 0 of FIG. 20 and through the horizontal word access cores to terminal H0 and diode CR0 to lead THL0 and through the operated THLA0 access drive switch to battery.

The operation of monopulser CSH of FIG. 16 also grounds, via the CSHA inverter, an input of the strobe position AND-NOT gate SP for 8 microseconds. After 2 microseconds monopulser D turns off and grounds the other input of gate SP thereby enabling it to place battery on the inputs of the monopulsers CSV and V.

Battery on the input of the CSV monopulser enables it to turn on inverter CSVA to operate current switch CSVB of FIG. 19 for a period of 12.5 microseconds. The vertical access current flows from ground through switch CSVB to the previously operated TA(0–9) access drive switch to the corresponding T(0–9) lead and CR50 diode to memory module 0 of FIG. 20 and through one of the previously identified horizontal word access cores to lead H0 and through the operated access drive switch HA0 to battery.

The V monopulser of FIG. 16 has a variable timing interval to compensate for end-to-end delays of the memory. The V monopulser output duration is determined by the operation of AND-NOT gates TH(1–4) of FIG. 18 wherein each gate adds 150 nanoseconds more delay time to the V monopulser depending upon the thousands address of the memory word to be read.

The operation of monopulser V places battery on the input of inverter SPA thereby turning it on and grounding the input to the strobe switch monopulser SW. When the V monopulser times out, the SW monopulser turns on inverter SWA to ground an input of the strobe control AND-NOT gate SC. With both inputs at ground, gate SC turns on and places battery on one of the inputs of the strobe amplifiers STR(0–4).

With battery on both inputs, strobe amplifier STR4 places battery on lead STR4. Battery on the STR4 lead sets the output register 0A4 and 0A7 flip-flops of FIG. 21 to the 1 state. In addition lead STR4 supplies battery to enable read detectors R(55–64) to detect bits 55 to 64 of the accessed word and to amplify them to a sufficient level to set the output register OB– and OC– flip-flops. The memory output is only present when the read detectors have been strobed, i.e., when a battery pulse appears on the strobe leads STR(0–4). Upon the strobing of read detectors R55–64, the output register OB– and OC– flip-flops are set according to the information located in bits 55 to 64 of the accessed word identified by the class information stored in the address register.

After completion of the memory first read, the clock circuit advances and grounds the clock pulse lead CP3 of FIG. 12. With ground on lead CP3, both inputs to AND-NOT gate R22 of FIG. 9 are grounded thereby enabling gate R22 to place battery on one of the two inputs to OR gate PG22. Battery applied to an input enables OR gate PG22 to place battery on lead PG22 to FIG. 21 to clear the output register 0A, 0B, and 0C flip-flops. The data obtained from the memory on the first read is discarded in order to eliminate any errors that may be obtained from the memory read action itself.

The clock circuit continues to advance by grounding clock pulse lead CP4. Ground on lead CP4 operates the inverter CP4 of FIG. 16 to place battery on the input of NOT-OR gate R. The enabling of gate R initiates the memory read function described above. The data obtained from bits 55 to 64 of the accessed word defined by the address register is retained in the output register 0B– and 0C– flip-flops of FIG. 21. At this point in time, the 0A4 and 0A7 flip-flops have been set to record the digit 0 by battery on the strobe lead STR4. The 0C– flip-flops have been set to register the digit information stored in bits 55 to 59 and the 0B– flip-flops contain the desired customer service digit stored in bits 60 to 64 of the accessed word.

The grounding of clock pulse lead CP5 operates AND-NOT gate R23 of FIG. 9 to place battery on lead PG23. Battery on lead PG23 to FIG. 21 enables the 0K(0–2) AND gates to gate the information stored in the output register into the 2-out-of-5 input check circuits CK(0–2) of FIG. 14. In addition, battery on lead PG23 enables the CK34 and CK37 NOT-OR gates to record the digit 0 in input check circuit CK3 and also initiates a 2-out-of-5 check timing function by operating NOT-OR gate CKI.

If the 2-out-of-5 check is successfully passed, the clock circuit will advance to ground clock pulse lead CP6. Ground on leads CF0 and CP6 enables AND-NOT gate R24 of FIG. 9 to place battery on lead PG24 to FIG. 21 to enable AND gates CC– to transfer the customer service digit stored in the output register OB– flip-flops into the customer code register CC– flips-flops of FIG. 10.

Figure 13:
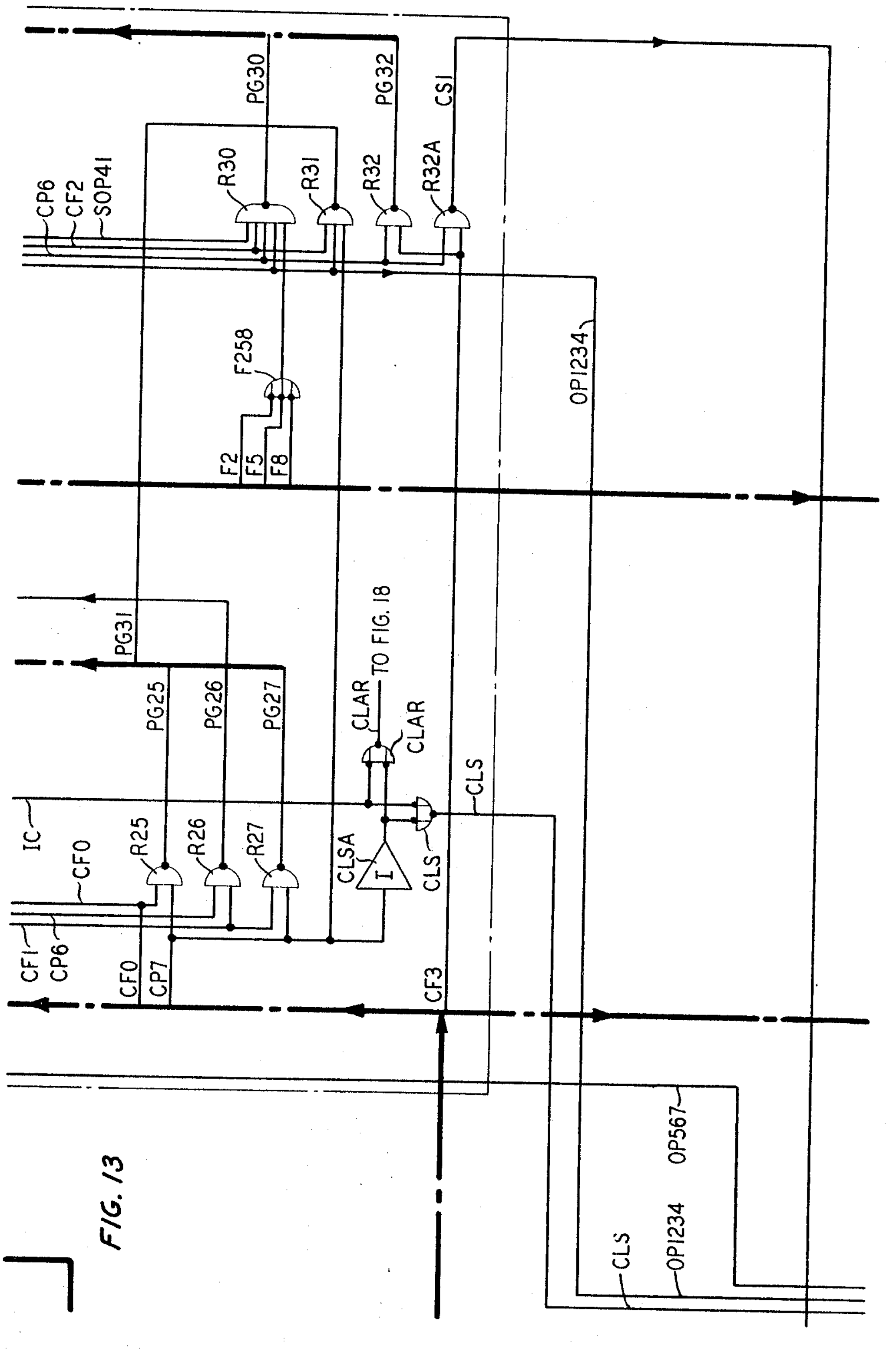

Ground on clock pulse lead CP7 to FIG. 13 turns on inverter CLSA to place battery on inputs of OR gates CLAR and CLS. Operation of the CLAR gate clears the address register TH–, HN–, T–, and U– flip-flops of FIG. 18 while gate CLS clears sector registers S0, S1, S2, S3 and S4 of FIG. 17.

Figure 10:
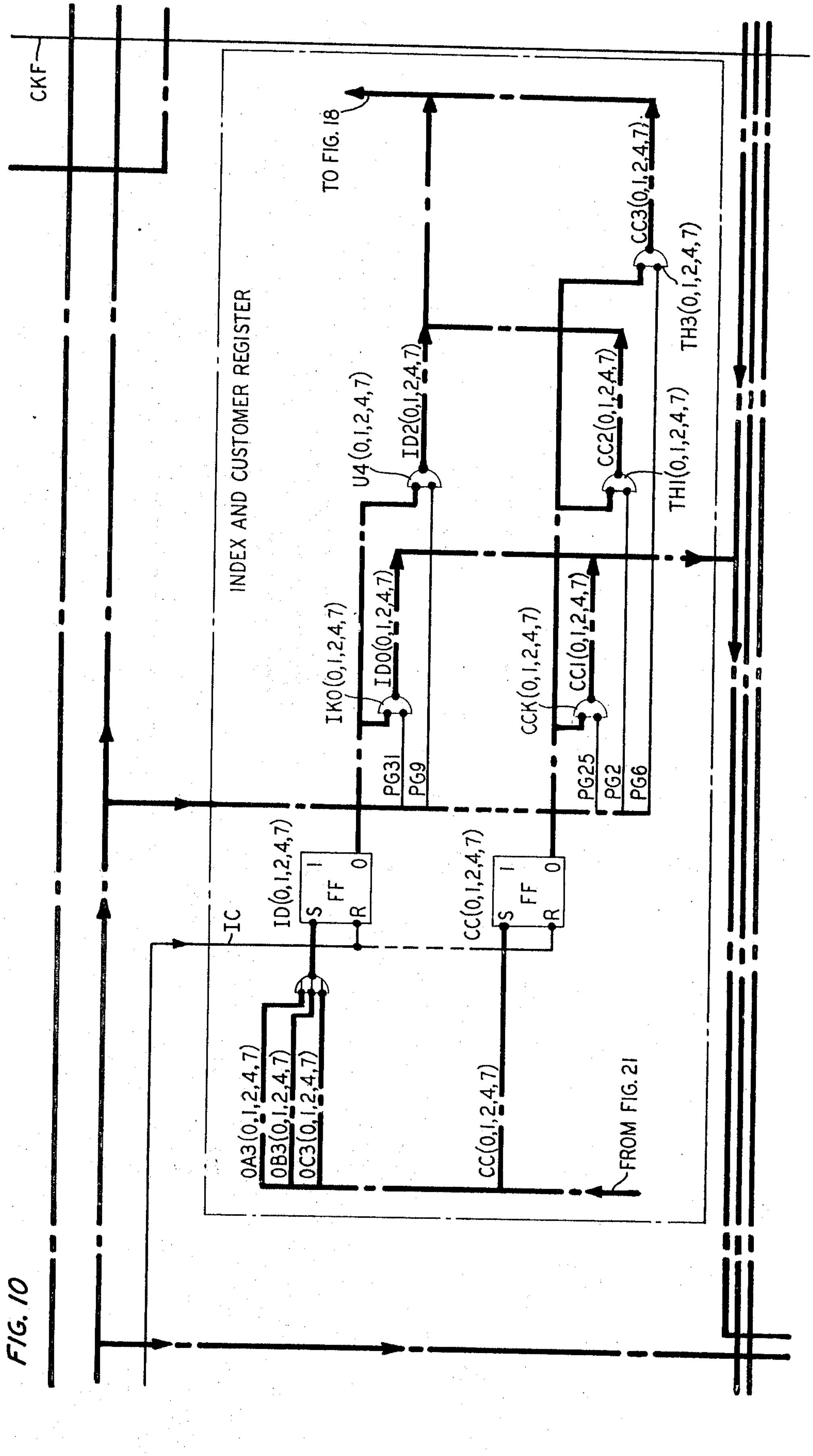
FIG. 10 is a schematic diagram of the index and customer registers.

In addition, the grounded CP7 lead enables AND-NOT gate R25 to place battery on the PG25 lead to FIG. 10 in order to operate AND gate CCK– to transfer the customer service digit from the customer code register to the 2-out-of-5 input check circuit CK0 of FIG. 14. Battery on lead PG25 also operates 2-out-of-5 NOT-OR gates of input check circuits CK(1–3) to register the digit 0 and initiates the 2-out-of-5 check timing function by operating NOT-OR gate CKI.

Assuming that the 2-out-of-5 check is successfully passed, removal of the ground on the CP7 lead of FIG. 12 operates the clock phase monopulser CF to ground the input to the counter phase advance switch CFA via inverter CFI. CFA switch operates and removes battery from the CA terminal of clock ring counter 3 thereby advancing the clock to ground lead CF1. The clock circuit continues to advance and output A of ring counter RC2 initializes RC1 and enables it to place ground on clock pulse lead CP0.

G. ABC or Three-Digit Translation

Proceeding with the description, the route translator utilizes the customer service digit as the thousands digit of the address register to locate the 1,000 word matrix wherein the customer translation tables are stored. In addition, the A, B, and C digits of the dialed directory number are utilized as the hundreds, tens, and units information required to locate a word in the ABC translation table. The information stored in sector 0 of the selected word contains the information required to continue the translation process.

The grounding of clock leads CF1 and CP0 operates AND-NOT gate AR2 of FIG. 8 to place battery on lead PG2. Battery on lead PG2 to FIGS. 10 and 3 enables AND gates CC2–, H1–, T1–, and U1– to transfer the information stored in the CC register and the A–, B–, and C– input buffers into the address register of FIG. 18. The digital information stored in the address register in turn operates the corresponding AND-NOT gates TH–, HU–, T–, U– to set the access drive switches THHA–, THLA–, HA–, TA–, and UA– of FIG. 19.

The occurrence of ground on the clock pulse lead CP1 to FIG. 9 enables AND-NOT gate R21 to initiate the 2-out-of-5 check function described above on the contents of the address register. In addition, ground on clock leads CP1 and CF1 to FIG. 17 enables AND-NOT gate SOA to set sector register SO to the 1 state thereby placing battery on the SO lead to the strobe amplifier STRO.

Advance of the clock to clock pulse CP2 grounds the CP2 lead to enable the CP2 inverter of FIG. 16 to initiate a first memory read function. On clock pulse CP3, the information acquired by the first read is discarded by the enabling of AND-NOT GATE R22 of FIG. 9 to clear the output register OA–, OB–, and OC– flip-flops of FIG. 21. The ground on clock pulse lead CP3 also operates AND-NOT gate R20 and its associated OR gate PG20 for the purpose of clearing the temporary register TA–, TB–, and TC– flip-flops of FIGS. 11 and 15.

A second memory read is initiated by ground on lead CP4 and the information required to locate the three-digit route code answer is now stored in the output register OA–, OB–, and OC– flip-flops.

Ground on the clock pulse lead CP5 enables AND-NOT gate R23 to place battery on lead PG23 in order to initiate a 2-out-of-5 check function on the translation control data stored in the output register.

The clock advancing to ground leads CF1 and CP6 to FIG. 13 enables AND-NOT gate R26 to place battery on lead PG26 to FIG. 21 to operate AND gates TA–, TB–, and TC– to gate the information stored in the output registers OA–, OB–, and OC– flip-flops into the the temporary register TA–, TB–, and TC– flip-flops of FIGS. 11 and 15.

The digit stored in the TA– flip-flops is the operation code (OP) that controls all future address manipulations and directs the subsequent path through the route translation tables. For a three-digit translation the digit 7 is stored in the TA– flip-flops. The next two digits stored in the temporary register TB– and TC– flip-flops represent the tens and units address location of the desired three-digit route code answer stored in sector 1 of words 000 to 099.

Digit 7 stored in the TA0 and TA7 flip-flops grounds both inputs to AND-NOT gate OP7 to place battery on lead OP71 to the respective inputs of the AND-NOT gate AR3 and NOT-OR gate OP567 of FIG. 8. The operation of gate OP567 places ground on input of AND-NOT gate AR8 and on lead OP567 to FIGS. 16 and 9 to inputs of AND-NOT gates RS and CCC. In addition inverter OPA7 of FIG. 11 operates to place ground on inputs of AND-NOT gates SIB and AR6 of FIGS. 17 and 8.

The occurrence of clock pulse CP7 initiates a 2-out-of-5 check function on the contents of the temporary register. In addition ground on the CP7 lead, as described above, results in the clearing of the sector registers S(0–4) and the address register. Providing that the 2-out-of-5 check has been successfully passed, the clock advances to the next clock phase CF2.

During the CF2 phase, the final three-digit translation address manipulations and memory interrogations are accomplished. The address information contained in the temporary register TB– and TC– flip-flops represent the word location in which 1-out-of-100 possible route code answers is located. During this cycle, the thousands part of the address register is set to the previously obtained customer service digit and the hundreds part of the address register is set to zero. In addition, the tens and units information is gated out of the temporary register TB– and TC– flip-flops into the T– and U– flips-flops of the address register. Finally, the desired route code answer is read from sector 1 of the word registered in the address register.

Ground on clock leads CF2 and CP0 to FIG. 8 operates AND-NOT gates AR6 and AR8. The operation of AR6, in turn, places battery on lead PG6 and operates OR gate PG1 to enable AND gates T0– and U0– of FIG. 15 to gate the address data stored in the temporary registers TB– and TC– flip-flops into the address register T– and U– flip-flops. Battery on lead PG6 to FIG. 10 enables AND gates CC3– to gate the customer service digit stored in the CC register into the TH– flip-flops of the address register. The operation of the AR8 gate of FIG. 8 places battery on the AR8 lead to FIG. 18 to set the address register HN4 and HN7 flip-flops to the 1 state.

Figure 17:
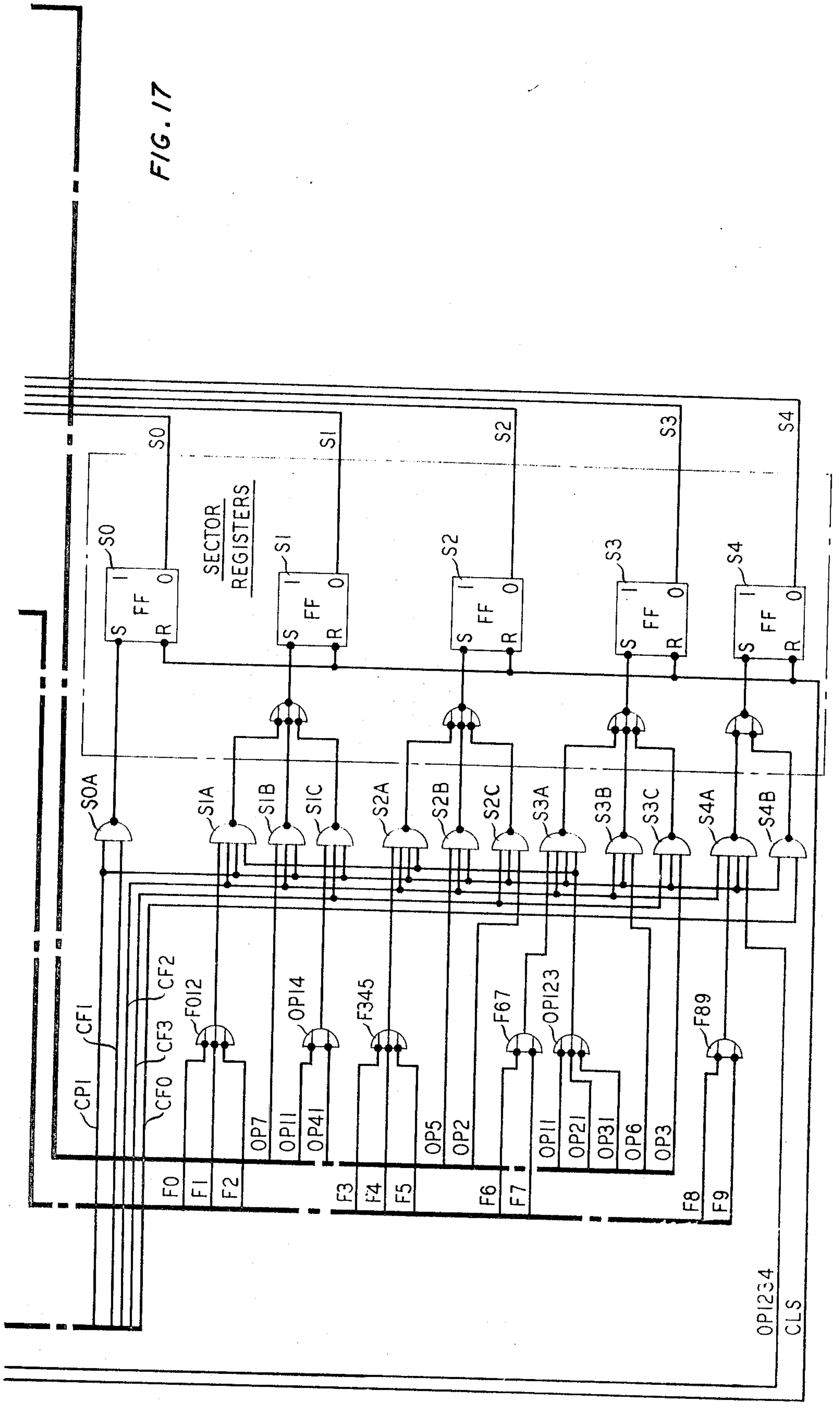
FIG. 17 is a schematic diagram of the sector registers and the gating control for the sector registers.

Ground on the CP1 lead initiates a 2-out-of-5 check function on the address register information and operates AND gate SIB of FIG. 17 to set sector register S1.

The clock continues to advance through clock pulses 2 through 5 in the same manner as described above. Assuming that the 2-out-of-5 check initiated by ground on clock pulse lead CP5 is successfully passed, the three-digit translation route code will be stored in the output register. The clock continues to run but does not perform any of the address manipulations usually performed on clock pulse CP6.

Ground on clock pulse lead CP7 clears the sector and address registers and advances the clock to the CF3–CP0 cycle.

Ground on clock phase lead CF3 to FIGS. 16 and 9 operates AND-NOT GATES RS and CCC. Operation of gate RS places battery on one of the inputs to gate R1 and inhibits R1 operation during the memory read function normally initiated on clock pulses 2 and 4. With both inputs at ground, gate CCC operates to inhibit AND-NOT gates R21, R22, and R23. Thus these gates are prevented from initiating an address and output register 2-out-of-5 check function and from clearing the output register. With these gates disabled, no gating or read functions are performed during clock pulses CP0 through CP5.

The subsequent operation of AND-NOT gate R32A of FIG. 13 during clock pulse CP6 places battery on the CS1 lead to FIG. 12 to reset the clock driver flip-flop CD to the 0 state. With CD reset to the 0 state, AND-NOT gates MVC and OTR are disabled and the clock is stopped.

Ground on clock leads CF3 and CP6 also operates AND-NOT gates R32 of FIG. 13. Gate R32 places battery on lead PG32 to FIG. 21 to enable AND gates OAD–, OBD–, and OCD– to gate the three-digit translation route code from the output register to the relay driver circuits OAD–, OBD–, and OCD– of FIG. 3 to operate their respective 30A–, 30B–, and 30C– relays. These relays in operating ground 2-out-of-5 H–, T–, and U– leads to transfer the route code information to marker 106 via connector 109. After the marker has checked the route code data for the correct code format in the well-known manner, ground is returned on the CKR lead to operate the 3CKR relay.

H. Normal Release

The 3CKR relay, through the operation of the transfer contacts 3CKR, removes ground from the input of the ST1 inverter of FIG. 6 and places it on the input of the CKR inverter. In a short time the ST1 inverter, ST2 gate, and ST3 flip-flop circuits return to the normal state. The grounding of the input of the CKR inverter immediately releases the ST4 gate which, in turn, releases the LB inverter. The release of this inverter applies locking battery to the LB and LB1 leads to clear inputs of the trouble indicating and control flip-flops OT, BE1, CKF1, TRRL, CD, IN, and CPW of FIGS. 5 and 12.

The clearing of the CPW flip-flop and the resultant disabling of the clock removes ground from clock leads CF3 and CP6 thereby releasing output relays 3OA–, 3OB–, and 3OC–. Thus the states of all the internal control flip-flops are returned to the 0 state and the LB inverter continues to supply locking battery until the next marker request thereby assuring the correct initial state of the route translator.

I. D or Extra Digit Translation

On all calls from marker 106 the same sequence of events takes place during the CF0 and CF1 clock phase cycles. The class information is translated into a customer service digit and the ABC translation table is interrogated to obtain the OP code and supplemental address information. In the case of the D, or Extra Digit Translation, the first digit stored in the ABC translation table is either the OP code 5 or 6.

During clock phase CF2, the address information obtained from the ABC translation table is utilized along with the dialed D digit of the directory number to form the address necessary to access the D digit translation tables located at sectors 2 and 3 of the first 100 words of any 1,000 word matrix.

Prior to the start of clock phase CF2, the contents of the interrogated ABC translation table are stored in the temporary register shown in FIGS. 11 and 15. The TA– flip-flops contain either OP code 5 representing the output table located in sector 2 or OP code 6 representing the output table located in sector 3. The TB– flip-flops contain the thousands digit address of the D digit translation tables and the TC– flip-flops the tens address location of the particular word to be interrogated.

A 5 or 6 digit stored in the temporary register TA– flip-flops operates either AND-NOT gate OP5 or OP6 to place battery on the respective OP lead to the input of NOT-OR gate OP567 of FIG. 8. The enabling of gate OP567 as described above grounds inputs to AND-NOT gates AR8, RS, and CCC.

Ground on clock leads CF2 and CPO to FIG. 8 operates AND-NOT GATES AR3, AR5, and AR8. The operation of gate AR3 places battery on lead PG3 to FIG. 15 to enable AND gates TBD– to gate the digit stored in the TB– flip-flops into the address register TH– flips-flops. Gate AR8 places battery on lead AR8 to FIG. 18 to set the address register HN4 and HN7 flip-flops to the 1 state. OR gate PG10 is turned on by the operation of AND-NOT gate AR5 and supplies battery on lead PG10 to FIG. 15 to AND gate TC0– to gate the information stored in temporary register TC– flips-flops into the address register T– flip-flops of FIG. 18. Battery on lead PG5 to FIG. 4 in the same manner enables diode gates U3– to transfer the dialed D digit from the D– input buffers into the address register U– flip-flops.

On the advance of the clock to clock pulse CP1 a 2-out-of-5 check function is initiated on the address register and the sector register S2 or S3 of FIG. 17 is set by the operation of AND-NOT gate S2B or S3B in response to the operation code 5 or 6 recorded in temporary register TA– flip-flops.

Assuming a valid 2-out-of-5 check, the clock circuit continues to advance through the clock pulses CP2 to CP5 in the manner described above. The translation route code is read into the output register from memory at the word specified by the address register and the sector determined by sector registers S2 or S3.

No gating functions occur during clock pulse CP6 and the clock continues to advance by grounding lead CP7. The occurrence of clock pulse CP7 results in the placing of battery on leads CLS and CLAR to subsequently clear all the S– sector registers and the entire address register. Removal of ground on lead CP7 advances the clock to clock phase CF3. Ground on the CF3 lead enables AND-NOT gates RS and CCC to inhibit any further memory read functions, 2-out-of-5 check of the address and output registers, and the clearing of the output registers. Thus no translation functions occur on clock pulses CP0 through CP5.

Occurrence of clock pulse CP6 operates AND-NOT gates R32 and R32A which, in the manner described above, stops the clock and initiates the gating of the translated route code from the output register to the relay driver circuits OAD–, OBD–, and OCD– in order to transfer the translated route code to the marker 106 via connector 109. The return of ground on the CKR lead initiates a normal release function.

J. DEF or Six-Digit Translation

The first two clock phases CFO and CF1 of a six-digit translation are identical to those for 3- and 4-digit translations. At the end of clock phase CF1 and the digital information stored in the ABC translation table at the word location corresponding to the dialed ABC directory digits has been read from memory and gated into the temporary register.

The OP code 1, 2, or 3 is stored in the temporary register TA– flip-flops to identify the sector wherein is located the translated route code. The operation code permits the sharing of a DEF translator index location by three NPA's and allows the packing of eight possible combinations of two answers for each NPA in the portion of the DEF output table associated with the DEF translator index location. Temporary register TB– flip-flops contain the digit identifying the thousands block containing the DEF translation table identified by the digit stored in the TC– flip-flops.

On clock phase CF2 the thousands address digit obtained from the ABC translation table is utilized in combination with the DEF dialed digits to interrogate the DEF translation table. Clock phase CF3 utilizes the single digit obtained from the DEF translation table in combination with the contents of the TB– and TC– flip-flops to locate the word containing the translated route code at the sector specified by the OP code.

Operation code 1, 2, or 3 stored in the temporary register TA– flip-flops of FIG. 11 operates the respective AND-NOT gates OP1, OP2, or OP3 to place battery on one of the inputs to NOT-OR gates OP1234 and OP123 of FIGS. 8 and 17. The operation of these two gates grounds inputs to AND-NOT gates AR4, AR9, AR10 of FIG. 8, gates R28, R29, R30, R31 of FIGS. 9 and 13, and the S1A, S2A, S3A, S4A gates of FIG. 17. In addition, operation of gate OP1 enables NOT-OR gate OP14 of FIG. 17 to ground an input of sector AND gate S1C. In a similar manner operation codes 2 and 3 turn on inverter OPA2 or OPA3 thereby grounding an input to either sector AND-NOT gates S2C or S3C.

The 10 DEF translator tables are located within each thousands matrix and are arranged so that the 0, 1, and 2 translators occupy data digit columns 3, 4 and 5, respectively, of sector 1. This numbering arrangement is continued for the remaining translators so that translator 9 occupies data digit column 12. The DEF translator identification digit stored in the temporary register TC– flip-flops of FIG. 15 operates the corresponding F(0–9) AND-NOT gate to enable the proper sector register of FIG. 17 in preparation for a memory read. In addition, operation of one of the F(0–9) gates enables one of NOT-OR gates F036, F1479, or F258 of FIGS. 9 and 13 to ground an input to one of AND-NOT gates R28, R29, and R30 so as to be able to gate the DEF translator stored digit from the output register into the index register ID– flip-flops of FIG. 10.

The advance of the clock to the third phase grounds the clock leads CF2 and CP0 Ground on these leads to FIG. 8 results in the operation of AND-NOT gates AR3 and AR4. Operation of gate AR3 places battery on lead PG3 to FIG. 15 to enable AND gates TBD– to gate the thousands address digit stored in the TB– flip-flops into the TH- flip-flops of the address register. Operation of gate AR4 supplies battery on lead PG4 to FIG. 4 to enable AND gates H2–, T2–, and U2– to gate the dialed DEF digits from the D–, E–, and F– input buffers into the respective HN–, T–, and U– flip-flops of the address register.

Occurrence of clock pulse CP1 enables AND-NOT gate R21 to initiate a 2-out-of-5 check on the contents of the address register. In addition, the appropriate AND-NOT gate S1A, S2A, S3A, or S4A of FIG. 17 is enabled to set the related sector register S1, S2, S3, or S4 according to the previous operation of one of NOT-OR gates F012, F345, F67, F89 in response to the DEF translator number stored in the temporary register TC– flip-flops.

Assuming a valid 2-out-of-5 check, the clock continues to advance to clock pulse CP6 thereby reading from memory the sector contents of the interrogated word specified by the address register into the output register. Ground on clock leads CF2 and CP6 to FIGS. 9 and 13 along with the operation of NOT-OR gate 1234 and one of NOT-OR gates F036, F1479, and F258, enables one of the three AND-NOT gates R28, R29, or R30. The operation of one of these gates places battery on its associated PG28, PG29, or PG30 lead to FIG. 21 to gate the DEF translator interrogated digit from either the output register OA–, OB–, and OC– flip-flops into the ID– index register of FIG. 10 via AND gates OA3–, OB3–, OC3–.

The occurrence of clock pulse CP7 enables AND-NOT gate R31 of FIG. 13 to initiate a 2-out-of-5 check on the ID– register. In addition, CP7 also places battery on leads CLAR and CLS to clear the address and sector registers.

Removal of ground on clock lead CP7 initiates a clock advance to the fourth clock phase CF3. Ground on clock leads CF3 and CP0 to FIG. 8 operates AND-NOT gates AR9 and AR10 to place battery on leads PG9 and PG10. Battery on lead PG9 to FIG. 18 sets the address register HN0 and HN1 flip-flops to the 1 state and enables AND gates TBO– of FIG. 15 to gate the thousands address digit from the temporary register TB– flip-flops into the address register TH– flips-flops. In addition, battery on lead PG9 to FIG. 10 enables AND gates U4– to gate the DEF translator interrogated digit from the index register into the address register U– flip-flops. Battery on lead PG10 to FIG. 15 enables AND gates TC0– to transfer the number of the DEF translator from the temporary register TC– flip-flops into the address register T– flip-flops.

Thus, at this time, the address register has been primed with the thousands address information obtained from the ABC translation table and has been forced to register 1 in the hundreds position. In addition, the address register tens position has been set to the DEF translator number and the units position registers the data digit read from the DEF translation table.

Advance of the clock to ground the CP1 lead enables AND-NOT gate R21 of FIG. 9 to initiate a 2-out-of-5 check on the contents of the address register. In addition, one of AND-NOT gates S1C, S2C, or S3C shown in FIG. 17 is enabled in accordance with the OP code stored in the temporary register TA– flip-flops to set the corresponding sector register to the 1 state.

Assuming a valid 2-out-of-5 check, the clock continues to advance through clock phase CP6 thereby reading the translation route code answer from memory into the output register and gating the result into the relay driver circuits OAD–, OBD–, and OCD–. The route translator, in the manner described above, transfers the translated route code to marker 106 via connector 109 and receives a release indication as returned ground on the CKR lead.

K. Special DEF Translation

The special DEF translation requires that the route translator be able to provide more than 10 output answers. For this type of translation, the interrogated ABC translation table stores operation code OP4 in data digit 0 and the thousands block matrix location of the required DEF translation table 8 in data digit 1. It should be noted that a special DEF translation requires the interrogation of DEF translation table 8 and that this table store the index 9 when an answer other than those associated with the first nine indices is required. The stored index digit 9 makes it possible to obtain more DEF translation table capacity by utilizing the index stored in the adjacent DEF translation table 9. Thus, a special DEF translation, may be utilizing indices 0–8 of DEF translation table 8 and indices 0–9 of DEF translation table 9 and by adjusting to the area of the DEF output table, obtain a maximum of 19 output answers.

The first two clock phases are identical to those for the ABC, D and DEF translation procedures described above. During the third clock phase CF2, a ground on clock pulse lead CP0 enables AND-NOT gates AR3 and AR4 of FIG. 8 to gate the thousands block matrix address digit stored in the temporary register TB– flip-flops and the dialed DEF directory digits into the address register in the same manner as described for the DEF translation procedure above.

Operation code OP4 and DEF translator identification digit 8 stored respectively in the temporary register TA– and TC– flip-flops enable NOT-OR gates OP1234 and F89 to ground the corresponding inputs of AND-NOT gate S4A of FIG. 17. Thus, advance of the clock to clock pulse CP1 operates gate S4A to set the sector register S4 to the 1 state and in addition enables gate R21 to initiate a 2-out-of-5 check on the address register contents.

The clock continues to advance through clock pulse CP5, thereby interrogating the memory at the word location identified by the dialed DEF digits and reading out the contents of data digits 11 and 12 into the output register OC– and OB– flip-flops. If the stored index of DEF translator 8 registered in the OC– flip-flops is other than 9, AND-NOT gate SOP4 of FIG. 8 is inhibited and the translation continues to proceed as described by the DEF translation procedure above.

However, the setting of the output register OC2 and OC7 flip-flops enables gate SOP4 to place battery on the inputs of AND-NOT gates AR10, R28, R29, and R30. In addition, gate SOP4 turns on inverter SOP to ground inputs of AND-NOT gates AR11 and R33.

The occurrence of clock pulse CP6 to FIG. 9 enables AND-NOT gate R33 and OR gate PG29 to place battery on lead PG29 to FIG. 21 to enable AND gates OB3 to gate the stored index digit in the output register OB– flip-flops into the index register.

The clock continues to advance, in the manner described in the preceding DEF translation, to the fourth clock phase CF3. Ground on the CP0 lead to FIG. 8 operates AND-NOT gates AR9 and AR11. Operation of gate AR9 places battery on lead PG9 to FIGS. 15 and 10 to enable AND gates TB0– and U4– to gate information from the temporary register TB– flip-flops and the index register ID– flip-flops into the address register thousands and units positions. In addition, battery on the PG9 lead sets the address register HN0 and HN1 flip-flops. The enabling of AND-NOT gate AR11 places battery on the AR11 lead to set the address register T2 and T7 flip-flops.

From this point on the route translator circuit continues to advance through the remaining clock cycles in the identical manner as performed for a regular DEF translation.

L. Trouble Release FIG. 5

During the idle condition of the route translator locking battery is applied on the LB lead to the input of the TRRL flip-flop to reset TRRL to the 0 state and ground the respective inputs to relay driver TBL and AND-NOT gate TR. Seizure of the route translator removes the locking battery. However, with the 5TRC relay released, TRRL remains in the 0 state.

The operation of one or more of the OT, BE1, and CKF1 trouble recording flip-flops places battery on the inputs of the corresponding relay drivers to operate the 5OT, 5BE, and 5CKF relays. The operation of these relays grounds a trouble indicating lead through their respective make contacts to trouble recorder 110. In addition, battery on one of the inputs of NOT-OR gate TR2 enables TR2 to ground the corresponding input to AND-NOT gate TR.

Gate TR in operating places battery on the input of relay driver TRI to operate the 5TRST relay and on the TR lead to FIG. 12 to reset the CD flip-flop to the 0 state to stop the clock. Closure of the 5TRST relay contacts prepares an operating path for the 5TRC relay from ground in the trouble recorder through the normal contacts of the RLS key and the make 5TRST contacts to the 5TRC relay coil winding to battery. Operation of the 5TRC relay supplies battery through the 5TRC–1 make contacts to set the TRRL flip-flop to the 1 state. With TRRL set to 1, battery is placed on the 0 lead to the input of relay driver TBL. In addition, closure of the 5TRC–2 make contacts prepares a hold path to ground for the 5TRC relay through the normal release key RLS contacts of trouble recorder 110. Battery on the TRRL flip-flop 0 lead inhibits AND-NOT gate TR and enables relay driver TBL to operate the 5TBL relay. The 5TRST relay releases. However, the 5TRC relay continues to remain operated through the make 5TRC–2 contacts. Operation of the 5TBL relay grounds the TBL lead through the 5TBL make contacts to start trouble recorder 110 and to initiate a trouble release condition in marker 106 in the well-known manner.

The circuit may be restored to normal by operating the trouble recorder release RLS key and opening the hold path for the 5TRC relay. Release of the 5TRC relay removes battery from the input of the TRRL flip-flop thereby allowing locking battery on the LB lead to reset TRRL to the 0 state. The resulting ground on the 0 output of the TRRL flip-flop releases the 5TBL relay and enables AND-NOT gate TR to record subsequent failures.

SUMMARY

It is obvious from the foregoing that the flexibility, economy, and efficiency of switching systems may be substantially enhanced by the provision of a translator capable of translating a variety of 3-, 4-, and 6-digit directory combinations into switching instructions for use in both the DDD and commercial subscriber dedicated networks. It is further obvious from the foregoing that the aforesaid translator's unique feature of performing internal manipulations solely by data substitutions in the address field without conversion, shifting, and masking functions, and for interrogating different areas within the same word location, obviates the need for more memory capacity than in fact can be effectively utilized.

While the equipment of our invention has been disclosed in an automatic switching system wherein a telephone directory number is translated into a route code switching instruction, it is to be understood that such an embodiment is intended to be illustrative of the principles of our invention and that numerous other arrangements may be devised by those skilled in the art without departing from the spirit and scope of the invention.

For example, the translator may be employed in any arrangement wherein it is desired to translate any first combination of numerical digits to a predetermined second combination of numerical digits.

Another example would be the employment of the memory read principle to any application wherein it is desired to read only a segment of the total information stored in a memory word location directly into an output register without using additional adding, substrating, shifting, or masking functions.

What is claimed is:

1. In a communication system,
a plurality of stations, each assigned a station address,
means for completing a connection from a first one of said stations to a second one of said stations in response to route data corresponding to a portion of said second station address, and
means for translating said portion of said second station address to said corresponding route data comprising
a plurality of memory cells comprising a plurality of matrices each comprising first co-ordinates and second co-ordinates, said first co-ordinates forming a plurality of word locations, said second co-ordinates forming a plurality of digit locations,
means for selecting one of said word locations in said first co-ordinates,
means selectively operable for directly reading control data from a predetermined number of said digit locations of said selected word location,
means for registering said control data, and
means controlled by said registered control data in combination with said portion of said second station address for reading said corresponding route data from a predetermined number of said digit locations in said second co-ordinates.

2. In a communication system,
a plurality of stations, each assigned a station address,
control means for registering said station addresses,
a switching network controlled by said control means for completing a connection from a first one of said stations to a second said station in response to route data corresponding to a first portion of said second station address, and
a translator for translating said first portion of said second station address to said corresponding route data comprising
a plurality of memory cells registering control and route data in a plurality of matrices each comprising first co-ordinates and second co-ordinates, said first co-ordinates forming a plurality of word locations, said second co-ordinates forming a plurality of digit locations,
first means for registering said first portion of said second station address,
second means for registering control data,
means controlled selectively by said first means and said second means for selecting one of said word locations in said first co-ordinates,
means selectively operable for reading said control data from a predetermined number of said digit locations of said selected word location, and
means controlled by said control data in combination with said first portion of said second station address for reading said corresponding route data from a predetermined number of said digit locations in said second co-ordinates.

3. In a communication system,
the combination set forth in claim 2 in which said first means comprises
a plurality or relays controlled by said control means for registering a predetermined number of digits of said second station address, and
buffer means enabled by operation of said relays for storing said predetermined number of digits of said second station address in a predetermined binary code format.

4. In a communication system,
the combination set forth in claim 2 in which said second means comprises
a plurality of registers for storing a predetermined number of digits of said control data in a predetermined binary code format.

5. In a communication system,
the combination set forth in claim 2 in which said means for selecting one of said word locations comprises
an address register controlled selectively by said first means and said second means for recording said word location in a predetermined binary code format.

6. In a switching system
a plurality of stations each assigned a station address,
switching means for connecting one of said stations to another of said stations in response to route data corresponding to a first part of said other station address, and
a translator comprising
input buffer means for registering said first part of said other station address,
memory means for storing said route data and control data defining said route data in a plurality of matrices each comprising first co-ordinates and second co-ordinates, said first co-ordinates forming a plurality of word addresses, said second co-ordinates forming a plurality of storage cell locations,
register means for temporarily storing said control data,
address means selectively controlled by said input buffer means and said register means for recording one of said word addresses,
memory access means controlled by said address means for selecting said one word address in said first co-ordinates,
means selectively operable for reading said control data from a predetermined number of said storage cell locations less in number than said plurality of storage cell locations comprising said selected word address,
means for registering said control data, and
means controlled by said registered control data in combination with said first part of said other station address for reading said corresponding route data from a second predetermined number of said storage cell locations in said second co-ordinates.

7. In a switching system
the combination set forth in claim 6 in which said memory access means comprises
a plurality of current switches, a plurality of access switches each responsive to said address means, and means enabled by said current switches in combination with a predetermined number of said access switches for selecting one of said plurality of word addresses corresponding to said word address recorded in said address means.

8. In a switching system the combination set forth in claim 7 in which said memory access means further comprises logic means operable to convert said word addresses recorded in said address means in a predetermined binary code format into decimal code format indications for purpose of controlling said access switches.

9. In a switching system the combination set forth in claim 6 in which said means selectively operable for reading control data comprises a plurality of sector registers, and logic gating means controlled by said register means for setting one of said plurality of sector registers corresponding to the co-ordinate locations of said predetermined number of said storage cells.

10. In a switching system the combination set forth in claim 6 comprising a plurality of strobe amplifiers controlled by said register means, a plurality of read detectors, and means controlled by one of said strobe amplifiers for enabling a predetermined number of said read detectors less in number than said plurality of read detectors to read said control data from a predetermined number of said storage cell locations.

11. In a switching system the combination set forth in claim 6 in which said means for registering said control data comprises a plurality of registers less in number than said plurality of storage cell locations and means for registering said control data read from said predetermined number of said storage cell locations in said plurality of registers in a predetermined binary code format.

12. A translator for translating a first number to one of a plurality of second numbers comprising a memory for storing said second numbers and control data defining said second numbers in a plurality of matrices each comprising first co-ordinates of word locations and second co-ordinates of digit locations, an input buffer for registering said first number, register means for registering said control data, an address register controlled selectively by said input buffer and said register for registering the address of one of said word locations, an output register for registering selectively one of said second numbers and a predetermined number of said control data, means controlled by said address register for selecting said one word location in said first co-ordinates, means selectively operable for reading said control data from a predetermined number of said digit locations comprising said selected one word location into said register means, and means controlled by said control data in combination with said first number for reading into said output register said one second number from a predetermined number of said digit locations in said second co-ordinates.

13. In a translation system, means for translating a first combination of numerical digits to a predetermined second combination of numerical digits comprising timing means, memory means for storing a plurality of said predetermined second combinations of numerical digits and a plurality of control digits defining said second combinations of numerical digits in an N-out-of-M binary code format in cell storage locations comprising a plurality of matrices each comprising first co-ordinates and second co-ordinates, said first co-ordinates forming a plurality of word locations, said second co-ordinates forming a plurality of said cell storage locations, input buffer means for registering said first combination of numerical digits in said N-out-of-M binary code format, register means for temporarily recording predetermined numbers of said control digits in said N-out-of-M binary code format, address means controlled selectively by said input buffer means and said register means for recording one of said word locations in said N-out-of-M binary code format, memory access means controlled by said address means and enabled by said timing means for selecting said one of said word locations in said first co-ordinates, means enabled by said timing means for reading a predetermined number of said control digits from a predetermined number of said cell storage locations less in number than said plurality of said cell storage locations comprising said selected word location, output means for registering said predetermined number of said control digits in said N-out-of-M binary code format, means controlled by said registered control digits in combination with said first combination of numerical digits and enabled by said timing means for reading said predetermined second combination of numerical digits from a second predetermined number of said cell storage locations in said second co-ordinates, and detecting means enabled by said timing means for selectively detecting presence of N-out-of-M binary bits of digital data registered in said register means, said address means, and said output means in said N-out-of-M binary code format.

14. In a translation system the combination set forth in claim 13 in which said timing means comprises a clock circuit for generating a predetermined series of pulse signals for controlling a predetermined sequence of translation functions.

15. In a translation system the combination set forth in claim 13 in which said detecting means comprises a plurality of converters each operable for converting said N-out-of-M binary bits of digital data to an output signal of selected voltage levels corresponding to predetermined numbers of said bits of digital data, logic gating means enabled by said timing means for selectively gating said digital data registered in said register means, said address means, and said output register means into said converters, detector means connected to said plurality of converters and controlled by said output signals of selected voltage level for generating a plurality of binary signals defining said voltage level of said output signals, and means enabled by said timing means and controlled by said plurality of binary signals for providing an output indication when said digital data code format is other than said N-out-of-M binary code format.

16. In a translation system the combination set forth in claim 15 in which said detecting means further comprises check register means enabled by said output indication means for registering a failure in said N-out-of-M binary code format of said digital data, relay means enabled by said check register means for providing a trouble indication of said failure, and means enabled by said check register means for inhibiting said timing means.

17. In a telephone switching system a plurality of stations each assigned a station class of service and a station address, a marker for registering a class of service of a first one of said stations and a station address of a second one of said stations,
a switching network controlled by said marker for completing a path from said first station to said second station in response to a route code corresponding to a first portion of said second station address, and
a translator for translating a first part of said first portion of said second station address in combination with a second part of said first portion of said second station address to said corresponding route code comprising
a timing circuit,
a clock circuit,
a plurality of memory cells for storing control data defining said route code and said route code in a plurality of matrices each comprising first co-ordinates forming a plurality of word locations and second co-ordinates forming a plurality of digit locations,
a first buffer for registering said first station class of service,
a second buffer for registering said first portion of said second station address,
a first register for temporarily storing a predetermined number of digits,
a second register for temporarily storing one digit, and
means enabled by said timing circuit for gating said first station class of service from said first buffer into said first register,
means controlled by said first register in combination with said clock circuit for selecting a first one of said word locations corresponding to said first station class of service in a first one of said plurality of matrices,
means selectively enabled by said clock circuit for reading first control data from a predetermined one of said plurality of digit locations into said second register,
means controlled by said second register in combination with said second input buffer and enabled by said clock circuit for selecting a second one of said word locations corresponding to a first part of said first portion of said second station address in one of said plurality of matrices,
means enabled by said clock circuit for reading second control data from a predetermined number of said plurality of digit locations into said first register,
means controlled by said first register and said second buffer in combination with said clock circuit for selecting one of said word locations corresponding to a third part of said second control data in combination with a second part of said first portion of said second station address in a second one of said plurality of matrices corresponding to a second part of said second control data,
means controlled by said first register and enabled by said clock circuit for reading said route code from a predetermined number of said plurality of digit locations corresponding to a first part of said second control data, and
means for registering said route code in said marker.

18. In a telephone switching system
the combination set forth in claim 17 in which said means for registering said route code in said marker comprises
a plurality of output registers less in number than said plurality of digit locations forming said second ordinate for registering said route code in an N-out-of-M binary code format,
a plurality of relays each responsive to one of said plurality of output registers for registering said route code in a predetermined code format, and
means enabled by said plurality of relays for registering said route code in said predetermined code format in said marker.

19. In a telephone switching system
a plurality of stations each assigned a station address,
a plurality of lines each assigned a class of service,
a plurality of trunks each assigned a trunk class,
a marker for selectively interconnecting said lines and said trunks by switching arrangements defined by a plurality of route codes, and
a translator for translating a first part of a first portion of a station address in combination with a second part of said first portion of said station address to a corresponding one of said plurality of route codes comprising
a timing circuit,
a clock circuit,
a memory for storing digits of control data defining said plurality of route codes and digits of said plurality of route codes in a plurality of matrices each comprising first co-ordinates forming a plurality of word locations and second co-ordinates forming a plurality of sector locations each composed of a plurality of digit locations,
a first buffer for registering selectively a station class of service and a trunk class in an N-out-of-M binary code format,
a second buffer for registering said first portion of a station address in said N-out-of-M binary code format,
a first register for temporarily storing a predetermined number of said digits in said N-out-of-M binary code format,
a second register for temporarily storing any one of said digits in said N-out-of-M binary code format,
a third register for temporarily storing any one of said digits in said N-out-of-M binary code format,
means enabled by said timing circuit for gating selectively said station class of service and said trunk class into said first register,
means controlled by said first register in combination with said clock circuit for selecting one of said word locations corresponding to said registered station class of service and said registered trunk class in a first one of said plurality of matrices,
means enabled by said clock circuit for selecting a predetermined one of said sector locations and for reading first control data from a predetermined one of said plurality of digit locations into said second register,
means controlled by said second register in combination with said second buffer and enabled by said clock circuit for locating a second one of said word locations corresponding to said first part of said first portion of said station address in one of said plurality of matrices corresponding to said first control data,
means enabled by said clock circuit for defining a first one of said sector locations and for reading second control data from said plurality of digit locations comprising said first sector location into said first register,
means controlled by said first register in combination with said second buffer and enabled by said clock circuit for defining a third one of said word locations corresponding to said second part of said first portion of said station address in one of said plurality of matrices corresponding to said second control data,
means controlled by said first register and enabled by said clock circuit for locating one of a first predetermined number of said plurality of sector locations and for reading third control data from one of said plurality of digit locations into said third register,

20. In a telephone switching system
the combination set forth in claim 19 in which said first buffer comprises
a first plurality of relays controlled by said marker for registering a predetermined number of digits of said station class of service in said N-out-of-M code format,
a second plurality of relays controlled by said marker for registering said trunk class in a decimal code format, and
means enabled selectively by operation of said first plurality of relays for storing said station class of service in said N-out-of-M binary code format and by operation of said second plurality of relays for storing said trunk class in said N-out-of-M binary code format.

21. In a switching system
a plurality of stations each assigned a station address and a station code, a plurality of switching networks each assigned a service digit corresponding to one of said station codes for connecting any of said stations to any other of said stations in response to a route code corresponding to a first part of each station address in combination with a second part of each said station address, and a translator for translating said first part of each said station address in combination with said second part of each said station address to said corresponding route code comprising a timing circuit, a clock circuit, a memory for storing tables of control data defining said route code, a table of said service digits, and said route code in a plurality of matrices each comprising first co-ordinates of word locations and second co-ordinates of word sector locations each of said sector locations composed of a plurality of digit locations, a first buffer for registering said station codes, a second buffer for registering said first part and said second part of each said station address, a first register for temporarily storing a predetermined number of digits, a second register for temporarily storing a single digit, a third register for temporarily storing a single digit, means enabled by said timing circuit for gating one of said station codes from said first buffer into said first register, means controlled by said first register in combination with said clock circuit for selecting one of said word locations corresponding to said one of said station codes in a first one of said plurality of matrices, means enabled by said clock circuit for selecting a predetermined one of said sector locations and for reading a selected one of said service digits from a predetermined one of said plurality of sector digit locations of said selected word location into said second register, means controlled by said second register in combination with said second buffer and enabled by said clock circuit for locating a second one of said word locations corresponding to said first part of each said station address in one of said plurality of matrices corresponding to said one of said service digits, means enabled by said clock circuit for defining a first one of said sector locations and for reading first control data from said plurality of sector digit locations comprising said first sector location of said located second word location into said first register, means controlled by said first register in combination with said second buffer and enabled by said clock circuit for defining a third one of said word locations corresponding to said second part of each said station address in one of said plurality of matrices corresponding to a second part of said first control data, means controlled by said first register and enabled by said clock circuit for locating said predetermined one of said sector locations and for selectively reading second control data from a predetermined first one of said plurality of sector digit locations comprising said located sector location and for reading third control data from a second one of said plurality of sector digit locations adjacent to said predetermined first one of said plurality of sector digit locations in response to a predetermined digit of said second control data stored in said predetermined first one of said plurality of sector digit locations of said defined third word location into said third register, means controlled by said first register and said third register in combination with said clock circuit for choosing a fourth one of said word locations corresponding to a third part of said first control data in selective combination with said second control data and said third control data in said one of said plurality of matrices corresponding to a second part of said first control data, and means controlled by said first register and enabled by said clock circuit for choosing one of a predetermined number of said plurality of sector locations corresponding to a first part of said first control data and for reading said corresponding route code from said plurality of sector digit locations comprising said selected one of a predetermined number of said plurality of sector locations.

22. In a switching system the combination set forth in claim 21 in which said timing circuit comprises a plurality of timing devices for initiating a clearing sequence of all said registers and for starting said clock circuit.

* * * * *

UNITED STATES PATENT OFFICE
CERTIFICATE OF CORRECTION

Patent No. 3,655,921 Dated April 11, 1972

Inventor(s) Richard Cobbold Busick and Eugene Daniel Masucci

It is certified that error appears in the above-identified patent and that said Letters Patent are hereby corrected as shown below:

The following three paragraphs were omitted in claim 19:

Column 24, between lines 59 and 60, insert --means controlled by said first register and said third register in combination with said clock circuit for choosing a fourth one of said word locations corresponding to said second control data in combination with said third control data in one of said plurality of matrices corresponding to said second control data, means controlled by said first register and enabled by said clock circuit for choosing one of a second predetermined number of said plurality of sector locations and for reading said corresponding one of said plurality of route codes from said plurality of digit locations comprising said choosen sector location, and means for registering said corresponding one of said plurality of route codes in said marker in an N-out-of-M code format.--.

Signed and sealed this 28th day of November 1972.

(SEAL)
Attest:

EDWARD M.FLETCHER,JR. — Attesting Officer

ROBERT GOTTSCHALK — Commissioner of Patents

USCOMM-DC 60376-P69
U.S. GOVERNMENT PRINTING OFFICE 1969 O—366-334